United States Patent
Kamiguchi et al.

(10) Patent No.: US 11,394,027 B2
(45) Date of Patent: Jul. 19, 2022

(54) MAGNESIUM SULFIDE MATERIAL, MAGNESIUM SULFIDE COMPOSITE MATERIAL, POSITIVE ELECTRODE MEMBER FOR SECONDARY BATTERIES, WIDE BAND GAP SEMICONDUCTOR MATERIAL, MAGNESIUM SECONDARY BATTERY, AND METHOD FOR PRODUCING ZINC BLENDE MAGNESIUM SULFIDE

(71) Applicant: MURATA MANUFACTURING CO., LTD., Kyoto (JP)

(72) Inventors: Kazuhiro Kamiguchi, Kyoto (JP); Ryuhei Matsumoto, Kyoto (JP); Kiyoshi Kumagae, Kyoto (JP); Shizuka Hosoi, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 261 days.

(21) Appl. No.: 16/720,963

(22) Filed: Dec. 19, 2019

(65) Prior Publication Data
US 2020/0176774 A1    Jun. 4, 2020

Related U.S. Application Data

(63) Continuation of application No. PCT/JP2018/023336, filed on Jun. 19, 2018.

(30) Foreign Application Priority Data

Jun. 21, 2017   (JP) .............................. JP2017-121201

(51) Int. Cl.
H01M 4/58        (2010.01)
H01M 10/054   (2010.01)
(Continued)

(52) U.S. Cl.
CPC ......... *H01M 4/5815* (2013.01); *H01M 4/136* (2013.01); *H01M 4/58* (2013.01);
(Continued)

(58) Field of Classification Search
None
See application file for complete search history.

(56) References Cited

U.S. PATENT DOCUMENTS

| | | |
|---|---|---|
| 5,506,855 A | 4/1996 | Ishibashi et al. |
| 2012/0306042 A1* | 12/2012 | Sou ...................... H01L 31/108 438/92 |
| 2014/0127594 A1 | 5/2014 | Nakayama et al. |

FOREIGN PATENT DOCUMENTS

| | | |
|---|---|---|
| CN | 103715455 | 4/2014 |
| JP | H07142812 A | 6/1995 |

(Continued)

OTHER PUBLICATIONS

Wang et al. "A Novel synthesis of MgS and its application as electrode material for lithium-ion batteries"; Journal of Alloys and Compounds; vol. 603, 5, Aug. 5, 2014, pp. 158-166.*
(Continued)

*Primary Examiner* — Laura Weiner
(74) *Attorney, Agent, or Firm* — K&L Gates LLP

(57) ABSTRACT

Provided is a magnesium secondary battery including a positive electrode member 23 including at least a positive electrode active material layer 23B, a separator 24 disposed facing the positive electrode member 23, a negative electrode member 25 containing magnesium or a magnesium compound disposed facing the separator 24, and an electrolytic solution containing a magnesium salt. The positive electrode active material layer 23B includes magnesium sulfide having a zinc blende type crystal structure.

3 Claims, 11 Drawing Sheets

(51) Int. Cl.
  *H01M 10/0568* (2010.01)
  *H01M 10/0569* (2010.01)
  *H01M 10/24* (2006.01)
  *H01M 4/136* (2010.01)
  *H01M 4/02* (2006.01)

(52) U.S. Cl.
  CPC ..... *H01M 10/054* (2013.01); *H01M 10/0568* (2013.01); *H01M 10/0569* (2013.01); *H01M 10/24* (2013.01); *H01M 2004/028* (2013.01); *H01M 2300/0025* (2013.01)

(56) References Cited

FOREIGN PATENT DOCUMENTS

| JP | 2004-265675 | 9/2004 |
|---|---|---|
| JP | 2004265675 A | 9/2004 |
| JP | 2013-232567 | 11/2013 |
| JP | 2014-072031 | 4/2014 |
| JP | 2014072031 A | 4/2014 |
| JP | 5628456 | 11/2014 |

OTHER PUBLICATIONS

International Search Report for Application No. PCT/JP2018/023336, dated Sep. 4, 2018.
Chinese Office Action dated Jun. 22, 2021 in corresponding Chinese Application No. 201880041817.
Chinese Office Action dated Jan. 19, 2022 in corresponding Chinese Application No. 201880041817.
Japanese Office Action dated Nov. 17, 2020 in corresponding Japanese Application No. 2019-525636.

* cited by examiner

MgS OF THE PRESENT
DISCLOSURE
(ZINC BLENDE STRUCTURE)

TYPICAL MgS
(SODIUM CHLORIDE TYPE
STRUCTURE)

MAGNESIUM SULFIDE MATERIAL, MAGNESIUM SULFIDE COMPOSITE MATERIAL, POSITIVE ELECTRODE MEMBER FOR SECONDARY BATTERIES, WIDE BAND GAP SEMICONDUCTOR MATERIAL, MAGNESIUM SECONDARY BATTERY, AND METHOD FOR PRODUCING ZINC BLENDE MAGNESIUM SULFIDE

TECHNICAL FIELD

The present disclosure relates to a magnesium sulfide material, a magnesium sulfide composite material, a positive electrode member for a secondary battery, a wide band gap semiconductor material, a magnesium secondary battery, and a method of producing zinc blende magnesium sulfide.

BACKGROUND ART

There have been reports on magnesium-sulfur secondary batteries using sulfur as a positive electrode active material so far; however, the structure of a product (referred to as "discharge product" for convenience) produced at the positive electrode during discharge of the secondary battery have not been elucidated. This is mainly because the discharge product has an amorphous structure that does not show a diffraction peak in X-ray diffraction. In fact, from the past reports, it has been found that magnesium sulfide (MgS) having a zinc blende structure collects a metastable layer in a standard state (Non-Patent Document 1: PHYSICAL REVIEW B 79, 235310, 2009). However, its existence has been confirmed only in a thin film sample using stress of a substrate (Non-Patent Document 2: APPLIED PHYSICS LETTERS 102, 032102 (2013)).

PRIOR ART DOCUMENTS

Non-Patent Documents

Non-Patent Document 1: PHYSICAL REVIEW B 79, 235310, 2009
Non-Patent Document 2: APPLIED PHYSICS LETTERS 102, 032102 (2013)

SUMMARY OF THE INVENTION

Problem to be Solved by the Invention

Although realization of a magnesium secondary battery having excellent characteristics is expected, the current magnesium secondary battery is still not sufficient. In addition, realization of a magnesium secondary battery started from charge is also expected.

Accordingly, an object of the present disclosure is to provide a magnesium secondary battery having excellent characteristics, a positive electrode member for a secondary battery suitable for use in such a magnesium secondary battery, a magnesium sulfide material, a magnesium sulfide composite material, and a wide band gap semiconductor material that can be applied to, for example, a positive electrode member for a secondary battery and various members and devices (or can be used for various members and devices), and a method of producing zinc blende magnesium sulfide.

Means for Solving the Problem

A method of producing zinc blende magnesium sulfide of the present disclosure for achieving the above object includes arranging a sulfur layer formed on a first electrode and a second electrode containing magnesium or a magnesium compound in a state in which an electrolytic solution containing a magnesium salt is sandwiched and causing a discharge between the first electrode and the second electrode to change the sulfur layer formed on the first electrode to zinc blende magnesium sulfide layer.

A magnesium sulfide material of the present disclosure for achieving the above object includes amorphous magnesium sulfide or a mixture containing crystallites with a particle size of 20 nm or less in amorphous magnesium sulfide. In this magnesium sulfide material, the crystallite includes magnesium sulfide having a zinc blende type crystal structure.

A magnesium sulfide composite material of the present disclosure for achieving the above object has a magnesium sulfide material layer formed on a substrate, the magnesium sulfide material layer includes amorphous magnesium sulfide or a mixture containing crystallites with a particle size of 20 nm or less in amorphous magnesium sulfide, and the crystallite includes magnesium sulfide having a zinc blende type crystal structure.

A positive electrode member of the present disclosure for achieving the above object is formed by forming a magnesium sulfide material layer, including magnesium sulfide having a zinc blende type crystal structure, on a positive electrode current collector.

A magnesium secondary battery of the present disclosure for achieving the above object is a magnesium secondary battery including a positive electrode member including at least a positive electrode active material layer, a separator disposed facing the positive electrode member, a negative electrode member containing magnesium or a magnesium compound disposed facing the separator, and an electrolytic solution containing a magnesium salt. In this magnesium secondary battery, the positive electrode active material layer includes magnesium sulfide having a zinc blende type crystal structure.

A wide band gap semiconductor material of the present disclosure for achieving the above object includes amorphous magnesium sulfide or a mixture containing crystallites with a particle size of 20 nm or less in amorphous magnesium sulfide. In this wide band gap semiconductor material, the crystallite includes magnesium sulfide having a zinc blende type crystal structure.

Advantageous Effect of the Invention

In the method of producing zinc blende magnesium sulfide of the present disclosure, a discharge is generated between the first electrode and the second electrode (that is, based on an electrochemical method), so that the sulfur layer formed on the first electrode is changed to zinc blende magnesium sulfide layer. Thus, a zinc blende magnesium sulfide layer in bulk or powder form can be obtained by an extremely easy method. The zinc blende magnesium sulfide obtained by the method of producing zinc blende magnesium sulfide of the present disclosure and magnesium sulfide in bulk or powder having a zinc blende type crystal structure in each of the magnesium sulfide material of the present disclosure, the magnesium sulfide composite material of the present disclosure, the positive electrode member for a secondary battery of the present disclosure, the wide band gap semiconductor material of the present disclosure, and the positive electrode active material layer of the magnesium secondary battery of the present disclosure are in a metastable state. Therefore, magnesium ions can be released relatively easily from zinc blende magnesium sulfide or magnesium sulfide having a zinc blende type crystal structure. Thus, it becomes possible to achieve a magnesium secondary battery excellent in high energy density and cycle characteristics, an electronic device (for example, a solar battery) and an electrochemical device having excellent characteristics. The advantageous effects described in the description are merely illustrative and not restrictive, and the present technology may have additional effects.

MODE FOR CARRYING OUT THE INVENTION

Figure 1:
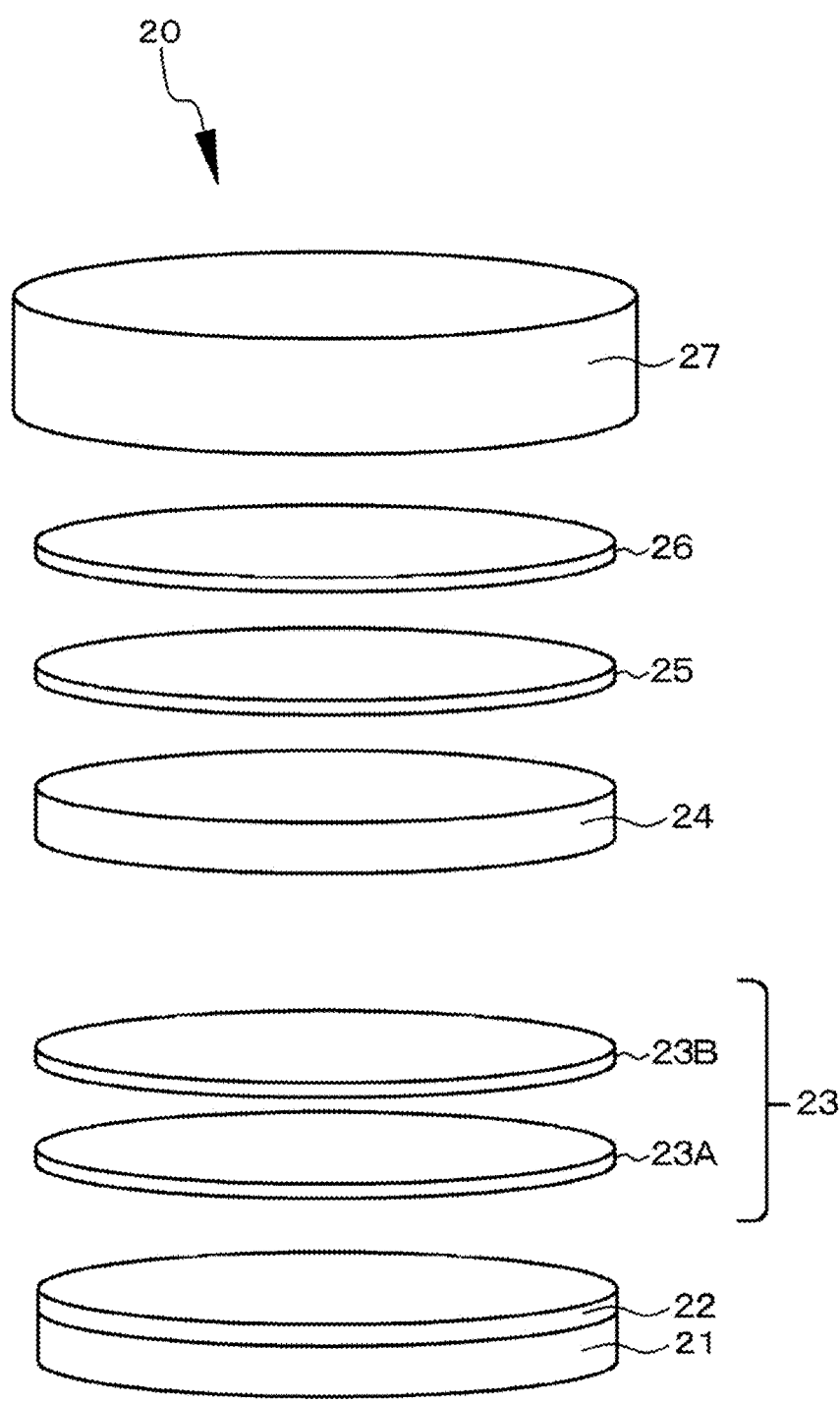
FIG. 1 is a schematic exploded view of a magnesium secondary battery of Example 1.

As described herein, the present disclosure will be described based on examples with reference to the drawings, but the present disclosure is not to be considered limited to the examples, and various numerical values and materials in the examples are considered by way of example. The description will be given in the following order.

1. The magnesium sulfide material, the magnesium sulfide composite material, the positive electrode member for a secondary battery, the wide band gap semiconductor material, the magnesium secondary battery, the method of producing zinc blende magnesium sulfide of the present disclosure, and description about the whole 2. Example 1 (the magnesium sulfide material, the magnesium sulfide composite material, the positive electrode member for a secondary battery, the wide band gap semiconductor material, the magnesium secondary battery, and the method of producing zinc blende magnesium sulfide)

3. Example 2 (Modification of Example 1)

4. Example 3 (Modification of Example 1, the wide band gap semiconductor material)

5. Example 4 (Application Example of the magnesium secondary battery of Example 1)

6. Others

<The Magnesium Sulfide Material, the Magnesium Sulfide Composite Material, the Positive Electrode Member for a Secondary Battery, the Wide Band Gap Semiconductor Material, the Magnesium Secondary Battery, the Method of Producing Zinc Blende Magnesium Sulfide of the Present Disclosure, and Description about the Whole>

In the method of producing zinc blende magnesium sulfide of the present disclosure, a first electrode and a second electrode are electrically connected via a resistor so that a discharge can be generated between the first electrode and the second electrode. As the resistor, a resistor provided in a suitable electric circuit or electronic circuit may be used.

In the magnesium sulfide composite material of the present disclosure, only a magnesium sulfide material layer may be formed on a substrate, or in some cases, a sulfur layer may be provided between the substrate and the magnesium sulfide material layer.

In the positive electrode member for secondary battery of the present disclosure, a magnesium sulfide material layer is formed of amorphous magnesium sulfide or a mixture containing crystallites with a particle size of 20 nm or less in amorphous magnesium sulfide. The crystallite may be formed of magnesium sulfide having a zinc blende type crystal structure.

Also in the magnesium secondary battery of the present disclosure, the positive electrode active material layer includes amorphous magnesium sulfide or a mixture containing crystallites with a particle size of 20 nm or less in amorphous magnesium sulfide. The crystallite may include magnesium sulfide having a zinc blende type crystal structure. In the magnesium secondary battery of the present disclosure including such a form, an electrolytic solution may include a solvent consisting of a sulfone, and a magnesium salt dissolved in the solvent. In the magnesium secondary battery of the present disclosure, more specifically, for example, although a positive electrode active material layer is formed on a positive electrode current collector, the positive electrode active material layer may include a collection of crystallites including magnesium sulfide having a zinc blende type crystal structure, or a sulfur layer may exist between the collection of crystallites including magnesium sulfide having a zinc blende type crystal structure and the positive electrode current collector.

In the present disclosure, magnesium sulfide includes amorphous magnesium sulfide or a mixture containing crystallites having a particle size of 20 nm or less in amorphous magnesium sulfide. In the present disclosure, "amorphous magnesium sulfide" or "mixture containing crystallites having a particle size of 20 nm or less in amorphous magnesium sulfide" means that when magnesium sulfide is observed in a region of several tens of μm (for example, a region of 50 μm×50 μm or a region larger than that) by an X-ray diffraction method (using Cu-Kα rays, the wavelength is 0.15405 nm), diffraction peaks are not observed except for those attributed to mixtures other than the positive electrode active material (specifically, the inherent sharp diffraction peak of magnesium sulfide is not observed). Using an X-ray diffractometer (RINT-TTRII) manufactured by Rigaku Corporation, measurement conditions are set as follows; a tube voltage: 45 kV, a tube current: 20 mA, and a scan speed: 0.5°/min, and a diffraction angle 2θ of 10 to 60 degrees may be a measurement range.

Although the crystallite has a zinc blende type crystal structure, whether or not the crystallite is "a crystallite having a zinc blende type crystal structure" can be determined based on an NMR measurement method. That is, solid-state $^{25}$Mg-NMR measurement is performed by the following method. Specifically, a powder sample to be analyzed is not washed with a solvent, but vacuum-dried as it is, and then the sample is packed into a solid-state NMR measurement sample tube having a diameter of 3.2 mm. Then, the sample tube is set on a Magic Angle Spinning (MAS) probe with a diameter of 3.2 mm attached to an 800 MHz solid-state NMR device (measured magnetic field intensity=18.79 T), and measurement is performed under the conditions shown in Table 1 below.

TABLE 1

Resonance frequency: 49.00 MHz
Observation range: 147 kHz
MAS rotation frequency: 15 kHz
Chemical shift standard: MgCl$_2$ aqueous solution (0 ppm)
Measurement pulse sequence: single pulse method
Measured pulse width: 1.6 μs (30° pulse)
Repetition time: 5 seconds
Number of times of integration: 32000 times Solid-state $^{33}$S-NMR measurement is performed by the following method. Specifically, a powder sample to be analyzed is not washed with a solvent, but vacuum-dried as it is, and then the sample is packed into a solid-state NMR measurement sample tube having a diameter of 3.2 mm. Then, the sample tube is set on a MAS probe with a diameter of 3.2 mm attached to an 800 MHz solid-state NMR device (measured magnetic field intensity=18.79 T), and measurement is performed under the conditions shown in Table 2 below. For the examples, in order to improve low sensitivity due to a low natural abundance ratio of $^{33}$S (0.76%), the measurement was performed on samples prepared using sulfur labeled with $^{33}$S isotope.

TABLE 2

Figure 3A:
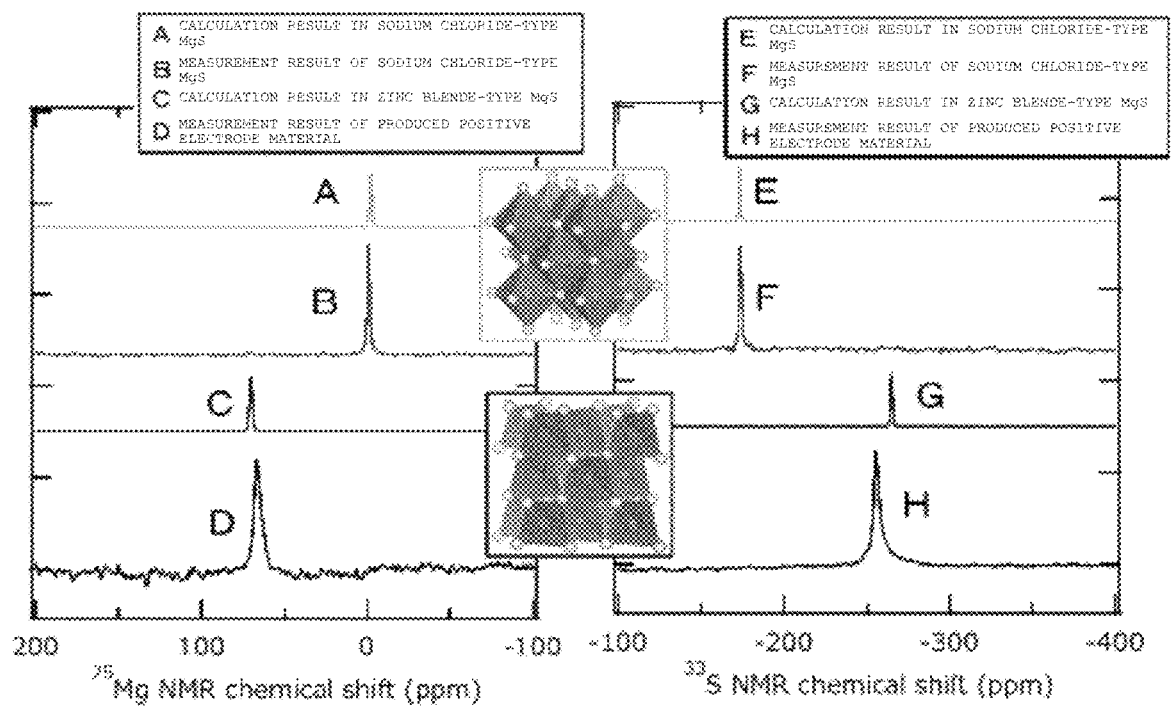
FIG. 3A is a graph showing solid-state $^{25}$Mg-NMR measurement results and solid-state $^{33}$S-NMR measurement results of positive electrode active material layers and chemical shift calculation obtained by first-principle calculation in the magnesium secondary batteries of Example 1 and Comparative Example 1.

Resonance frequency: 61.42 MHz
Observation range: 123 kHz
MAS rotation frequency: 15 kHz
Chemical shift standard: calcium sulfide (−29 ppm)
Measurement pulse sequence: single pulse method
Measured pulse width: 1.0 μs (30° pulse)
Repetition time: 0.5 seconds
Number of times of integration: 160000 times In the measurement of the sample based on the above NMR measurement method, if a chemical shift of $^{25}$Mg (see "D" in FIG. 3A) or $^{33}$S (see "H" in FIG. 3A) as shown in FIG. 3A is recognized in an NMR spectrum, it can be judged that there is a crystallite having a zinc blende type crystal structure. Although judgment is possible using either $^{25}$Mg or $^{33}$S, measurement using $^{25}$Mg which is more sensitive than $^{33}$S is relatively easier.

An atomic pair difference function of the sample is extracted using an HE-XRD method. Specifically, a powder sample to be analyzed is not washed with a solvent, but vacuum-dried as it is, and then the sample is packed into a quartz glass sample tube having a diameter of 2.0 mm. Then, the sample is irradiated with X-rays having an energy of 61.4 keV, and diffraction data up to 2θ=49° is acquired using a CdTe semiconductor detector. Then, absorption correction is performed on the obtained diffraction data based on a composition obtained from ICP analysis, and S (Q) up to Q=25.6 Å$^{-1}$ is extracted. Then, S (Q) is Fourier-transformed under the condition of ΔQ=0.05 Å$^{-1}$, and a pair distribution function g (r) and an atomic pair difference function G (r) are calculated. As a result of calculating the atomic pair difference function G (r), when an Mg—S interatomic distance of the sample is 2.5 Å (see FIG. 3B), a main phase is almost single-phase magnesium sulfide, and it can be judged that polysulfides that cannot be observed by NMR are not mixed.

A sulfur layer can be formed of S$_8$ or a polysulfide. Examples of the material constituting an electrolytic solution or a solvent include sulfone, ether, and broadly an aprotic solvent. The positive electrode member may be constituted of a positive electrode active material layer, or a positive electrode current collector and a positive electrode active material layer formed on the positive electrode current collector (on one side or both sides of the positive electrode current collector).

That is, an electrolytic solution constituting an electrolyte layer in the method of producing zinc blende magnesium sulfide of the present disclosure or the magnesium secondary battery of the present disclosure may contain, for example, sulfone and a magnesium salt dissolved in the sulfone. Such form may be referred to as "an electrolytic solution according to a first embodiment of the present disclosure" as a matter of convenience.

A magnesium salt may include MgX$_n$ (where n is 1 or 2 and X is a monovalent or divalent anion). In this case, X may include a halogen-containing molecule, —SO$_4$, —NO$_3$, or a hexaalkyl disiazide group. Specifically, the halogen-containing molecule (halide) may include MgX$_2$ (X=F, Cl, Br, I). Specific examples include magnesium fluoride (MgF$_2$), magnesium chloride (MgCl$_2$), magnesium bromide (MgBr$_2$), and magnesium iodide (MgI$_2$). Alternatively, the magnesium salt may be at least one magnesium salt selected from the group consisting of a mixed system of MgCl$_2$ and Mg(TFSI)$_2$ [magnesium bistrifluoromethanesulfonylimide], magnesium perchlorate (Mg(ClO$_4$)$_2$), magnesium nitrate (mg(NO$_3$)$_2$), magnesium sulfate (MgSO$_4$), magnesium acetate (Mg(CH$_3$COO)$_2$), magnesium trifluoroacetate (Mg(CF$_3$COO)$_2$), magnesium tetrafluoroborate (Mg(BF$_4$)$_2$), magnesium tetraphenylborate (Mg(B(C$_6$H$_5$)$_4$)$_2$, magnesium hexafluorophosphate (Mg(PF$_6$)$_2$), magnesium hexafluoroarsenate (Mg(AsF$_6$)$_2$), magnesium perfluoroalkylsulfonate ((Mg(R$_{f1}$SO$_3$)$_2$), wherein R$_{f1}$ is a perfluoroalkyl group, magnesium perfluoroalkylsulfonylimidate (Mg((R$_{f2}$SO$_2$)$_2$N)$_2$, wherein R$_{f2}$ is a perfluoroalkyl group, and magnesium hexaalkyl disiazide ((Mg(HRDS)$_2$), wherein R is an alkyl group. The above-mentioned magnesium salts including magnesium fluoride to (Mg(HRDS)$_2$) are referred to as "magnesium salt-A" as a matter of convenience. In the magnesium salt-A, the molar ratio of the sulfone to the magnesium salt is, for example, preferably 4 or more and 35 or less, more preferably 6 or more and 16 or less, still more preferably 7 or more and 9 or less, and is not limited thereto.

Another example of the magnesium salt in the electrolytic solution according to the first embodiment of the present disclosure is magnesium borohydride ($Mg(BH_4)_2$).

When the magnesium salt used is composed of magnesium borohydride ($Mg(BH_4)_2$) and therefore contains no halogen atom, the need for the production of various members constituting the magnesium secondary battery from materials having high corrosion resistance can be eliminated. The electrolytic solution can be produced by dissolving magnesium borohydride in the sulfone. The magnesium salt composed of magnesium borohydride ($Mg(BH_4)_2$) is conveniently referred to as "magnesium salt-B". The electrolytic solution of this type in the present disclosure is a magnesium ion-containing non-aqueous electrolytic solution in which the magnesium salt-B is dissolved in a solvent including the sulfone. The molar ratio of the sulfone to the magnesium salt-B in the electrolytic solution is, for example, 50 or more and 150 or less, typically 60 or more and 120 or less, preferably 65 or more and 75 or less, but is not limited to these values.

The sulfone in the electrolytic solution according to the first embodiment of the present disclosure is typically an alkylsulfone or an alkylsulfone derivative each represented by $R_1R_2SO_2$ (wherein $R_1$ and $R_2$ independently represent an alkyl group). Here, the types of $R_1$ and $R_2$ (i.e., the number of carbon atoms, and the combination thereof) are not particularly limited, and can be selected as required. The number of carbon atoms in each of $R_1$ and $R_2$ is preferably 4 or less. The sum total of the number of carbon atoms in $R_1$ and the number of carbon atoms in $R_2$ is preferably 4 or more and 7 or less, but is not limited thereto. $R_1$ and $R_2$ are each independently, for example, methyl group, ethyl group, n-propyl group, i-propyl group, n-butyl group, i-butyl group, s-butyl group and/or t-butyl group. An example of the alkylsulfone is at least one alkylsulfone selected from the group consisting of dimethyl sulfone (DMS), methyl ethyl sulfone (MES), methyl-n-propyl sulfone (MnPS), methyl-i-propyl sulfone (MiPS), methyl-n-butyl sulfone (MnBS), methyl-i-butyl sulfone (MiBS), methyl-s-butyl sulfone (MsBS), methyl-t-butyl sulfone (MtBS), ethyl methyl sulfone (EMS), diethyl sulfone (DES), ethyl-n-propyl sulfone (EnPS), ethyl-i-propyl sulfone (EiPS), ethyl-n-butyl sulfone (EnBS), ethyl-i-butyl sulfone (EiBS), ethyl-s-butyl sulfone (EsBS), ethyl-t-butyl sulfone (EtBS), di-n-propyl sulfone (DnPS), di-i-propyl sulfone (DiPS), n-propyl-n-butyl sulfone (nPnBS), n-butyl ethyl sulfone (nBES), i-butyl ethyl sulfone (iBES), s-butyl ethyl sulfone (sBES) and di-n-butyl sulfone (DnBS). An example of the alkylsulfone derivative is ethyl phenyl sulfone (EPhS). Among these sulfones, at least one sulfone selected from the group consisting of EnPS, EiPS, EsBS and DnPS is preferred.

Alternatively, the electrolytic solution in the present disclosure may contain an ether (generally an aprotic solvent) and a magnesium salt dissolved in the ether (aprotic solvent). Such form may be referred to as "an electrolytic solution according to a second embodiment of the present disclosure" as a matter of convenience.

The ether may be composed of a cyclic ether and/or a linear ether. Specific examples of the cyclic ether include at least one cyclic ether selected from the group consisting of tetrahydrofuran (THF), dioxolane, dioxane, epoxides, and furans.

Examples of the linear ether include dialkyl glycol ether. Examples of the dialkyl glycol ether include at least one dialkyl glycol ether selected from the group consisting of ethylene glycol dimethyl ether, diethylene glycol dimethyl ether, triethylene glycol dimethyl ether, tetraethylene glycol dimethyl ether, pentaethylene glycol dimethyl ether, hexaethylene glycol dimethyl ether, polyethylene glycol dimethyl ether and triethylene glycol butyl methyl ether. However, the dialkyl glycol ether is not limited thereto.

In this case, the magnesium salt may include $Mg(AlCl_3R^1)_2$ or $Mg(AlCl_2R^2R^3)_2$ (wherein $R^1$, $R^2$ and $R^3$ are each an alkyl group). The types of $R^1$, $R^2$ and $R^3$ (i.e., the number of carbon atoms, and the combination thereof) are not particularly limited, and can be selected as required. The number of carbon atoms in each of $R^1$, $R^2$ and $R^3$ is preferably 4 or less, but is not limited thereto. The sum total of the number of carbon atoms in $R^2$ and the number of carbon atoms in $R^3$ is preferably 4 or more and 7 or less, but is not limited thereto. Examples of each of $R^1$, $R^2$ and $R^3$ include methyl group, ethyl group, n-propyl group, i-propyl group, n-butyl group, i-butyl group, s-butyl group and t-butyl group.

Alternatively, the electrolytic solution in the present disclosure contains a solvent including the sulfone and a non-polar solvent and the magnesium salt-A dissolved in the solvent The non-polar solvent can be selected as required, and is preferably a non-aqueous solvent having a relative permittivity of 20 or less and 20 or less donors. A specific example of the non-polar solvent is at least one non-polar solvent selected from the group consisting of an aromatic hydrocarbon, an ether, a ketone, an ester and a linear carbonate ester. Examples of the aromatic hydrocarbon include toluene, benzene, o-xylene, m-xylene, p-xylene and 1-methyl naphthalene. Examples of the ether include diethyl ether and/or tetrahydrofuran. Example of the ketone is 4-methyl-2-pentanone. Examples of the ester include methyl acetate and/or ethyl acetate. Examples of the linear carbonate ester include dimethyl carbonate, diethyl carbonate and ethyl methyl carbonate.

The sulfone and the magnesium salt-A are as mentioned above. If necessary, the above-mentioned additive may be added to the electrolytic solution. The molar ratio of the sulfone to the magnesium salt-A is, for example, preferably 4 or more and 20 or less, more preferably 6 or more and 16 or less, still more preferably 7 or more and 9 or less, and is not limited thereto.

Other examples of the solvent include ethylene carbonate, propylene carbonate, dimethyl carbonate, diethyl carbonate, ethyl methyl carbonate, methyl propyl carbonate, acetonitrile, dimethoxyethane, diethoxyethane, vinylene carbonate, γ-butyrolactone, and/or tetrahydrofuran. These solvents may be used singly, or two or more of them may be used in the form of a mixture.

Alternatively, the solvent is preferably composed of a linear ether.

Specific examples of linear ethers include ethylene glycol dimethyl ether (dimethoxyethane), diethylene glycol dimethyl ether, triethylene glycol dimethyl ether, tetraethylene glycol dimethyl ether, pentaethylene glycol dimethyl ether, hexaethylene glycol dimethyl ether, polyethylene glycol dimethyl ether and/or triethylene glycol butyl methyl ether. Among these, ethylene glycol dimethyl ether (dimethoxyethane, DME) is preferably used.

The electrolyte layer may be composed of the electrolytic solution of the present disclosure and a polymeric compound that is a carrier for carrying the electrolytic solution therein. The polymeric compound may be one that can be swollen with the electrolytic solution. In this case, the polymeric compound swollen with the electrolytic solution may have a gel-like form. Examples of the polymeric compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and/or polycarbonate. Polyacrylonitrile, polyvinylidene fluoride, polyhexafluoropropylene, and/or polyethylene oxide are/is preferable in terms of electrochemical stability. The electrolyte layer may serve as a solid electrolyte layer.

In the method of producing zinc blende magnesium sulfide of the present disclosure including the above-mentioned preferable form, or in the magnesium secondary battery of the present disclosure including the above-mentioned preferable form, particularly, the magnesium salt more preferably includes magnesium chloride, and the electrolytic solution more preferably contains ethyl-n-propylsulfone (EnPS).

In the magnesium secondary battery of the present disclosure, the positive electrode current collector includes, for example, metal foil or alloy foil such as nickel, stainless steel, and/or molybdenum, a metal plate, an alloy plate, or a carbon material. However, as described above, the positive electrode member may not be provided with the positive electrode current collector, but may have a structure including only a positive electrode active material layer (layered positive electrode active material). The positive electrode active material layer may contain at least one of a conductive aid and a binder as necessary. The substrate and the first electrode can also be formed of, for example, the material constituting the positive electrode current collector.

The negative electrode member or the second electrode contains magnesium or a magnesium compound. Specifically, the negative electrode member or the second electrode includes magnesium (magnesium metal alone), a magnesium alloy, or a magnesium compound. Alternatively, a negative electrode active material layer may be formed on a surface of a base constituting the negative electrode member (specifically, a negative electrode current collector) or the second electrode. In this case, the negative electrode active material layer is constituted of a layer having magnesium ion conductivity. Specifically, examples of a material constituting the negative electrode active material layer include a magnesium (Mg) based material, and the negative electrode active material layer may further contain at least carbon (C), oxygen (O), sulfur (S) and halogen. Such a negative electrode active material layer preferably exhibits a single peak derived from magnesium in the range of 40 eV to 60 eV (both inclusive). Examples of halogen include at least one selected from the group consisting of fluorine (F), chlorine (Cl), bromine (Br), and iodine (I). In this case, the negative electrode active material layer more preferably exhibits, over a region from its surface to a depth of $2 \times 10^{-7}$ m, a single peak derived from magnesium in the range of 40 eV to 60 eV (both inclusive). This is because in such a case, the negative electrode active material layer will exhibit good electrochemical activity over the region from the surface to the inside. In addition, for a similar reason, the oxidized state of magnesium is preferably substantially constant from the surface to a depth of $2 \times 10^{-7}$ m in the negative electrode active material layer. Here, a back surface of the negative electrode active material layer means a surface on a side constituting an interface between the base of the negative electrode current collector or the second electrode and the negative electrode active material layer of both surfaces of the negative electrode active material layer. A front surface of the negative electrode active material layer means a surface on a side opposite to the back surface of the negative electrode active material layer. Whether the negative electrode active material layer contains the elements mentioned above can be confirmed based on XPS (X-ray Photoelectron Spectroscopy) method. In addition, the XPS method may also be used to determine whether the negative electrode active material layer exhibits the peak mentioned above and the oxidized state of magnesium. The negative electrode active material layer may contain at least one of a conductive aid and a binder as necessary. The negative electrode member is produced from, for example, a plate-like material or a foil-like material, but is not limited thereto, and can be formed (shaped) using powder. As described above, the negative electrode member may include a negative electrode current collector. Examples of the material constituting the base of the negative electrode current collector or the second electrode include metal foil or alloy foil such as copper, nickel, stainless steel, and/or magnesium, metal plates, and alloy plates.

Examples of the conductive aid contained in the positive electrode active material layer or the negative electrode active material layer include carbon materials such as graphite, carbon fibers, carbon black and carbon nanotubes. These components may be used singly, or two or more of them may be used in the form of a mixture. As the carton fibers, vapor growth carbon fibers (VGCFs) and the like can be used. As the carbon black, for example, acetylene black and/or Ketjen black can be used. As the carbon nanotubes, for example, single-wall carbon nanotubes (SWCNTs) and/or multi-wall carbon nanotubes (MWCNTs) such as double-wall carbon nanotubes (DWCNTs) can be used. Alternatively, a material other than carbon materials may also be used, as long as the material has good electric conductivity. For example, a metallic material such as a Ni powder, a conductive polymeric material and the like can also be used. As the binder contained in the positive electrode active material layer or the negative electrode active material layer, a fluorine-containing resin such as polyvinylidene fluoride (PVdF) and/or polytetrafluoroethylene (PTFE) and a polymeric resin such as a polyvinyl alcohol (PVA)-based resin and/or a styrene-butadiene copolymer rubber (SBR)-based resin can be used.

As the binder, a conductive polymer may also be used. As the conductive polymer, for example, a substituted or unsubstituted polyaniline, polypyrrole and polythiophene, and/or a (co)polymer composed of one or two components selected from these components may be used.

The positive electrode member and the negative electrode member are separated from each other by an inorganic or organic separator through which magnesium ions can pass, while preventing the occurrence of short circuit due to the contact between the positive electrode and the negative electrode. Examples of inorganic separators include glass filters and/or glass fibers. Examples of the organic separator include a synthetic resin porous film including polytetrafluoroethylene, polypropylene, and/or polyethylene, and can have a structure in which two or more kinds of these porous films are laminated. Among these, the porous film made of polyolefin is preferable, since such a film has a superior short circuit preventive effect and can improve safety of the battery by shutdown effect.

The magnesium secondary battery of the present disclosure can be used as a driving power source or an auxiliary power source of, for example, a notebook type personal computer, a personal digital assistant (PDA), a mobile phone, a smart phone, a master unit and a slave unit of cordless phone, a video movie, a digital still camera, an electronic book, an electronic dictionary, a portable music player, a radio, a headphone, a game machine, a navigation system, a memory card, a cardiac pacemaker, a hearing aid, an electric tool, an electric shaver, a refrigerator, an air conditioner, a television receiver, a stereo, a water heater, a microwave oven, a dishwasher, a washing machine, a dryer, a lighting apparatus, a toy, a medical device, an IoT device and an IoT terminal, a robot, a road conditioner, a traffic light, a railway vehicle, a golf cart, an electric cart, or an electric car (including a hybrid car). The magnesium secondary battery of the present disclosure can also be installed in, for example, a power supply for electric power storage use for an architectural structure including a house or a power-generating facility, or can be used for supplying an electric power to these facilities.

A conversion device which receives the supply of an electric power and converts the electric power to a driving force in an electric automobile is generally a motor. An example of a control device (controller) for executing an information processing associated with the control of a vehicle is a control device that can perform the display of a remaining battery level on the basis of the information about the remaining battery level of the magnesium secondary battery. The magnesium secondary battery can also be used in an electrical storage device in a so-called "smart grid". The electrical storage device can supply an electric power and can also store an electric power when receiving the supply of an electric power from other power source. Examples of the "other power source" include thermal power generation, nuclear power generation, hydroelectric power generation, a solar cell, wind power generation, geothermal power generation and a fuel cell (including a biofuel cell).

The magnesium secondary battery of the present disclosure including the above various preferable modes and configurations can be applied to a secondary battery, a control unit (controller) for controlling a secondary battery, and a secondary battery in a battery pack having an exterior enclosing the secondary battery. In the battery pack, the control means can perform, for example, the control of charging/discharging, over-discharging or over-charging associated with the secondary battery.

The magnesium secondary battery of the present disclosure including the above-mentioned various preferred embodiments and configurations can be applied to a secondary battery to be used in an electronic device that receives the supply of electric power from the secondary battery.

The magnesium secondary battery of the present disclosure including the above various preferable modes and configurations can be applied to a secondary battery in an electric vehicle including a conversion device for converting electric power supplied from the secondary battery into a driving force of the vehicle and a control device (controller) for performing information processing related to vehicle control based on information on the secondary battery.

In this electric vehicle, the conversion device typically receives electric power from the magnesium secondary battery, drives a motor, and generates a driving force. Driving of the motor can also use regenerative energy. Furthermore, for example, the control device (controller) performs information processing on vehicle control based on the remaining amount of a magnesium secondary battery. Examples of this electric vehicle include a so-called hybrid car in addition to an electric car, an electric motorcycle, an electric bicycle, and a railway vehicle.

The magnesium secondary battery of the present disclosure including the above various preferable modes and configurations can be applied to a secondary battery in a power system configured to receive electric power from the secondary battery and/or to supply electric power from a power source to the secondary battery. This power system may be any power system as long as the system uses electric power, and includes a simple electric power device. Examples of the electric power system include a smart grid, a home energy management system (HEMS), and a vehicle. The electric power system can also store electricity.

The magnesium secondary battery of the present disclosure including the above-mentioned various preferred embodiments and configurations can be applied to a secondary battery in a power storage power source including a secondary battery and configured to be connected to an electronic device to which electric power is supplied. This power storage power source can be basically used for any power system or power device regardless of application of the power storage power source, but can be used for a smart grid, for example.

The wide band gap semiconductor material of the present disclosure is of a direct transition type and is a bulk or powdery semiconductor material having a large band gap of 3 eV or more. The wide band gap semiconductor material of the present disclosure can be applied not only to a positive electrode member for a secondary battery but also to an electronic device such as a solar cell, a light receiving element, an imaging element, a light emitting element, a semiconductor device, and various sensors, and can also be applied to electrochemical devices such as flow type secondary batteries. The flow type secondary battery includes a positive electrode, a negative electrode, and a separator sandwiched between the positive electrode and the negative electrode and impregnated with an electrolytic solution.

Example 1

Example 1 relates to the magnesium sulfide material, the magnesium sulfide composite material, the positive electrode member for a secondary battery, the wide band gap semiconductor material, the magnesium secondary battery, and the method of producing zinc blende magnesium sulfide of the present disclosure.

A positive electrode member 23 of Example 1 is formed by forming a magnesium sulfide material layer 23B, including magnesium sulfide having a zinc blende type crystal structure, on a positive electrode current collector 23A.

A magnesium secondary battery 20 of Example 1 is a magnesium secondary battery including a positive electrode member 23 (in Example 1, specifically, the positive electrode member 23 including the positive electrode current collector 23A and the positive electrode active material layer 23B) including at least the positive electrode active material layer 23B, a separator 24 disposed facing the positive electrode member 23 (more specifically, the positive electrode active material layer 23B), a negative electrode member 25 containing magnesium or a magnesium compound disposed facing the separator 24, and an electrolytic solution containing a magnesium salt. The positive electrode active material layer 23B includes magnesium sulfide having a zinc blende type crystal structure.

The magnesium sulfide material of Example 1 or the wide band gap semiconductor material of Example 1 includes amorphous magnesium sulfide or a mixture containing crystallites having a particle size of 20 nm or less in amorphous magnesium sulfide. The crystallite has a zinc blende type crystal structure (the magnesium sulfide material of Example 1) or includes magnesium sulfide having a zinc blende type crystal structure (the wide band gap semiconductor material of Example 1).

The magnesium sulfide composite material of Example 1 has a magnesium sulfide material layer formed on a substrate. The magnesium sulfide material layer includes amorphous magnesium sulfide or a mixture containing crystallites with a particle size of 20 nm or less in amorphous magnesium sulfide, and the crystallite includes magnesium sulfide having a zinc blende type crystal structure.

In the positive electrode member for a secondary battery of Example 1, a magnesium sulfide material layer includes amorphous magnesium sulfide or a mixture containing crystallites with a particle size of 20 nm or less in amorphous magnesium sulfide. The crystallite includes magnesium sulfide having a zinc blende type crystal structure.

In the magnesium secondary battery of Example 1, the positive electrode active material layer 23B includes amorphous magnesium sulfide or a mixture containing crystallites with a particle size of 20 nm or less in amorphous magnesium sulfide. The crystallite includes magnesium sulfide having a zinc blende type crystal structure. Moreover, the electrolytic solution includes a solvent including sulfone and a magnesium salt dissolved in the solvent. In the magnesium secondary battery of Example 1, more specifically, the positive electrode active material layer 23B is formed on the positive electrode current collector 23A. The positive electrode active material layer 23B includes a collection of crystallites including magnesium sulfide having a zinc blende type crystal structure. The magnesium salt includes magnesium chloride ($MgCl_2$), and the sulfone constituting the solvent includes ethyl-n-propylsulfone (EnPS). Moreover, a sulfur layer is formed of sulfur $S_8$.

Figure 5:
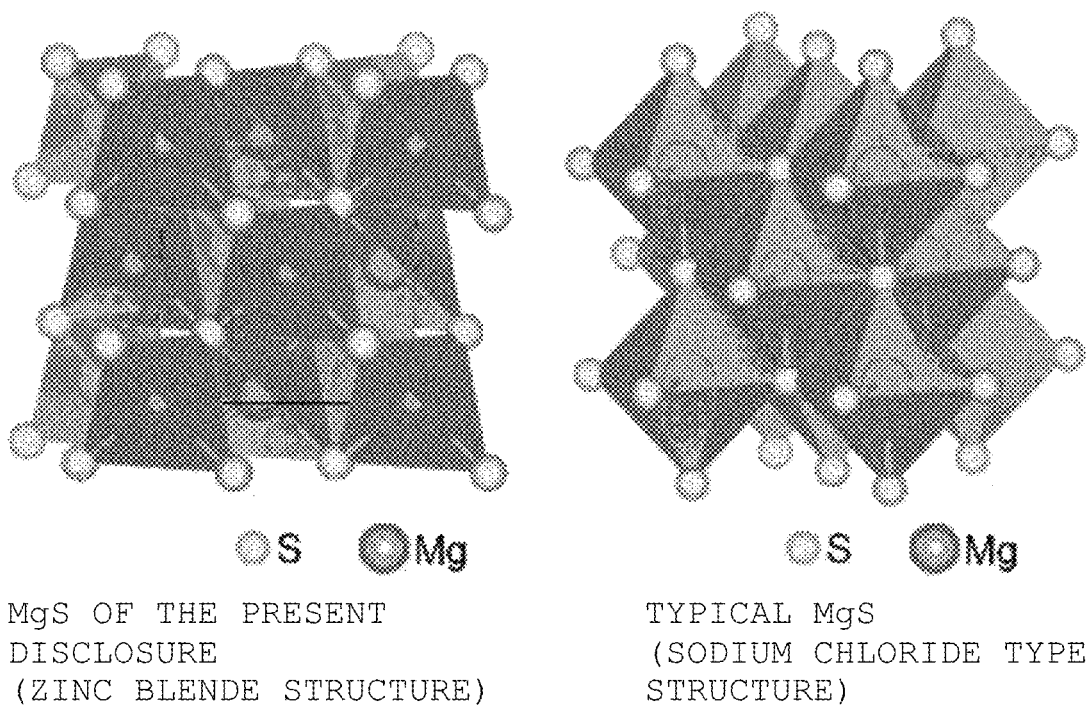
FIG. 5 is a view showing a crystal structure of magnesium sulfide having a zinc blende type crystal structure and a crystal structure of magnesium sulfide having a sodium chloride type six-coordinate structure.

In Example 1, more specifically, materials shown in Table 3 below were used as various members constituting the magnesium secondary battery. Sulfur (S) as the material constituting the positive electrode active material was used for producing the magnesium secondary battery of Example 1, and MgS having a sodium chloride type six-coordinate structure was used for producing a magnesium secondary battery of Comparative Example 1. FIG. 5 shows, on the left side, a crystal structure of magnesium sulfide having a zinc blende type crystal structure and shows, on the right side, a crystal structure of magnesium sulfide having a sodium chloride type six-coordinate structure.

TABLE 3

Materials constituting positive electrode active material
Sulfur (S): manufactured by Wako Pure Chemical Industries, Ltd.
MgS having a sodium chloride type six-coordinate structure: manufactured by Soegawa Rikagaku
Conductive aid
Ketjen Black: Lion Specialty Chemicals Co., Ltd. ECP600JD
Binder
Polytetrafluoroethylene (PTFE): manufactured by AGC Inc.
Material constituting negative electrode member
Magnesium plate: manufactured by Rikazai
Purity 99.9%, thickness 0.20 mm
Materials constituting electrolytic solution
$MgCl_2$ (anhydride): manufactured by Sigma-Aldrich Co. LLC.
Ethyl normal propyl sulfone (EnPS): dehydration specification for battery manufactured by Tomiyama Pure Chemical Industries, Ltd.

TABLE 3-continued

Material constituting separator: manufactured by Advantec Co., Ltd.
Glass filter GC50

In producing the magnesium secondary battery of Example 1, first, a positive electrode member was produced by the following method. That is, sulfur and Ketjen Black were mixed at a mass ratio of 7:3, and water, ethanol, a styrene-butadiene rubber suspension, and a carboxymethyl-cellulose aqueous solution were added to the obtained mixture and mixed for 5 minutes. The slurry thus obtained was applied onto a stainless steel foil as a positive electrode current collector 23A using a doctor blade. A doctor blade gap was set to 150 μm. Next, the positive electrode member in Example 1 was produced by vacuum drying at 40° C. for 12 hours. In the positive electrode member, a sulfur layer 23b is formed on the positive electrode current collector 23A and can be also referred to as a positive electrode member/starting member.

In producing the magnesium secondary battery of Comparative Example 1, first, a positive electrode member was produced by the following method. That is, MgS having a sodium chloride type six-coordinate structure, Ketjen Black, and polytetrafluoroethylene (PTFE) were mixed at a mass ratio of 1:6:3 using an agate mortar.

The resultant mixture was then rolled for about 10 times using a roller compactor while being softened with acetone. Thereafter, the resultant mold was vacuum dried at 70° C. for 12 hours to produce a positive electrode member in Comparative Example 1.

In both Example 1 and Comparative Example 1, $MgCl_2$/ethyl normal propyl sulfone (molar ratio 1:8) was used as the electrolytic solution. As the negative electrode member 25, a magnesium plate having a diameter of 15 mm and a thickness of 0.20 mm was used as shown in Table 3 above.

The electrolytic solution ($MgCl_2$-EnPS) was prepared as follows.

A reagent was weighed and mixed in a glove box (argon gas atmosphere/dew point–80° C. to –90° C.). Thereto was added 3.81 g of anhydrous magnesium (II) chloride ($MgCl_2$) while 100 ml of dehydrated methanol was stirred with a stirrer. It was confirmed by measuring a temperature outside a reaction container with a contact type thermometer that a slight amount of heat was generated when $MgCl_2$ was dissolved in methanol. This heat generation is due to heat of reaction when methanol is coordinated to Mg, and it is considered that methanol is coordinated to Mg in methanol. Cloudiness was observed slightly even after $MgCl_2$ was dissolved. It is considered that this is due to generation of $Mg(OH)_2$ by a reaction between water remaining in methanol and Mg. The amount of cloudiness was extremely small, and therefore operation was continued without filtration.

After $MgCl_2$ was dissolved, 43.6 g of EnPS was added under stirring with a stirrer. Then, this solution was taken out of the glove box while being kept in a state in which atmosphere was not mixed, and methanol was removed by heating and stirring the solution at 120° C. for 2 hours while the pressure was reduced using a rotary pump. When the amount of methanol was reduced, a white precipitate was generated. However, when heating was continued under reduced pressure, the generated precipitate was dissolved. It is considered that this change in solubility is caused by exchange of a Mg ligand from methanol to EnPS. Removal of methanol was confirmed by $_1H$ NMR measurement.

In the sample after removal of methanol, cloudiness generated when $MgCl_2$ was dissolved in methanol remained, and therefore filtration (pore diameter 0.45 µm; manufactured by Whatman Inc.) was performed in the glove box. The obtained electrolytic solution had a molar ratio of Mg:Cl:EnPS of 1:2:8 and a Mg concentration of 0.95 mol/l.

A configuration state of the magnesium secondary battery (coin battery 20, CR²016 type) of Example 1 is shown in the schematic diagram of FIG. 1. A gasket 22 was placed on a coin battery can 21, on which the positive electrode member 23 (the positive electrode current collector 23A and the positive electrode active material layer 23B) including sulfur ($S_8$), a separator 24, a negative electrode member 25 including a 0.25-mm-thick Mg plate having a diameter of 1.5 mm, a spacer 26 including a 0.5-mm-thick stainless-steel plate, and a coin battery lid 27 were stacked in this order and then sealed inside by crimping the coin battery can 21. The spacer 26 was previously spot-welded to the coin battery lid 27. The separator 24 contained the above-described electrolytic solution.

The magnesium secondary battery of Example 1 was first discharged at a constant current of 0.1 mA at room temperature and then charged at a constant current of 0.1 mA. On the other hand, the magnesium secondary battery of Comparative Example 1 was first charged at a constant current of 0.1 mA at room temperature.

That is, in Example 1, the sulfur layer 23b formed on the first electrode (specifically, the positive electrode current collector 23A) and the second electrode (specifically, the negative electrode member 25) containing magnesium or a magnesium compound are arranged in a state in which an electrolytic solution containing a magnesium salt is sandwiched, and a discharge is generated between the first electrode (the positive electrode current collector 23A) and the second electrode (the negative electrode member 25) to change the sulfur layer 23b formed on the first electrode (the negative electrode member 25) to a zinc blende magnesium sulfide layer (which is the positive electrode active material layer 23B and a layer including magnesium sulfide having a zinc blende type crystal structure). Specifically, the first electrode and the second electrode are electrically connected via a resistor, so that a discharge may be generated between the first electrode (the positive electrode current collector 23A) and the second electrode (the negative electrode member 25) (that is, it is only necessary to cause a normal discharge in the secondary battery). As described above, the magnesium salt is composed of magnesium chloride ($MgCl_2$), and the electrolytic solution includes ethyl-n-propylsulfone (EnPS).

Figure 12:
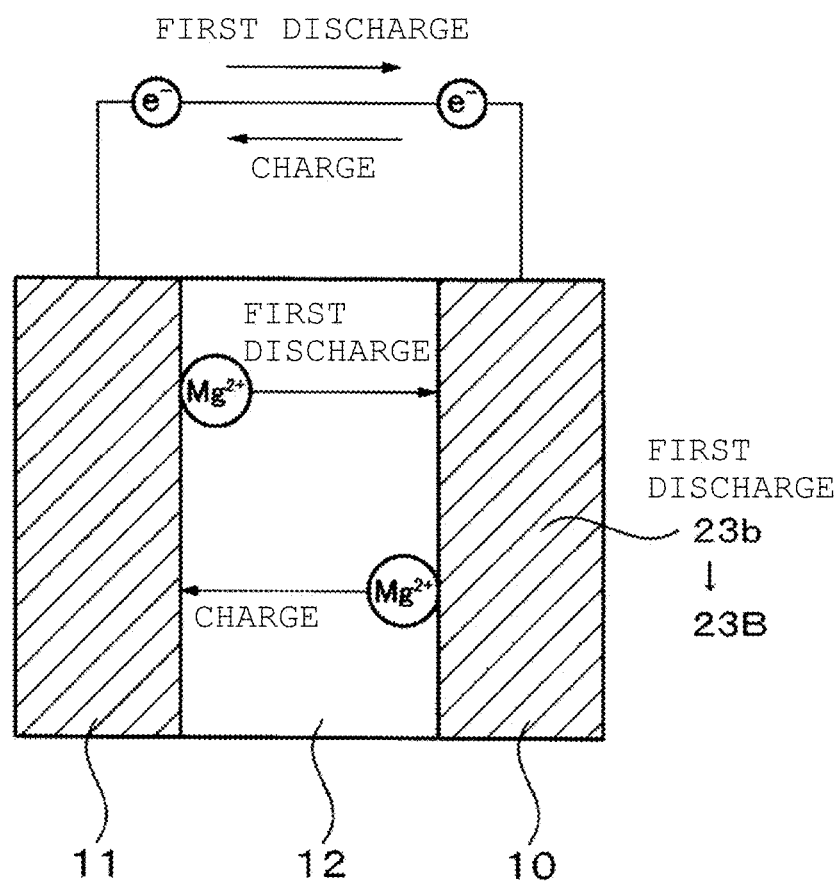
FIG. 12 is a conceptual diagram of the magnesium secondary battery of Example 1.

That is, in the magnesium secondary battery of Example 1 having the above-described configuration, as shown in the conceptual diagram of FIG. 12, during the first discharge, magnesium ions ($Mg^{2+}$) are transferred from a negative electrode member 11 to the sulfur layer 23b of a positive electrode member 10 through an electrolyte layer 12, so that the sulfur layer 23b formed on the positive electrode current collector is changed to a zinc blende magnesium sulfide layer (the positive electrode active material layer 23B).

In the magnesium secondary battery of Example 1, magnesium ions ($Mg^{2+}$) are transferred from the positive electrode active material layer 23B to the negative electrode member 11 through the electrolyte layer 12 during the first charge or during subsequent charge, and electric energy is thereby converted into chemical energy for power storage. On the other hand, the magnesium ions ($Mg^{2+}$) return from the negative electrode member 11 to the positive electrode active material layer 23B through the electrolyte layer 12 during the second discharge or during subsequent discharge, and electric energy is thereby generated. That is, the magnesium secondary battery of Example 1 is a magnesium secondary battery started from charge or discharge.

Figure 2A:
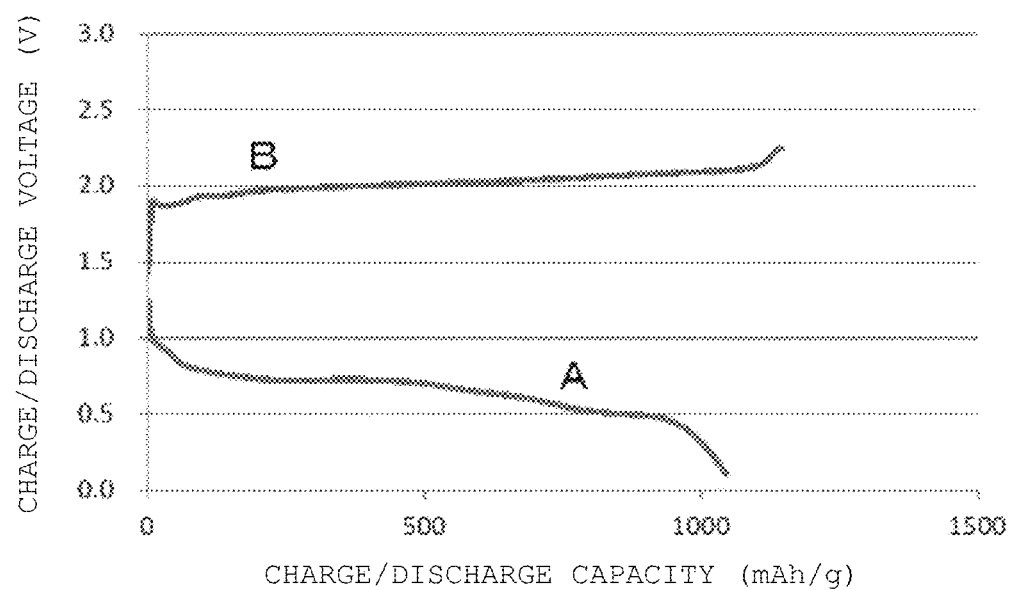
FIG. 2A is a graph showing a discharge curve when a first discharge in the magnesium secondary battery of Example 1 is performed, and a charge curve when a first charge is performed.

FIG. 2A shows a discharge curve (indicated as "A" in FIG. 2A) during the first discharge of the magnesium secondary battery of Example 1 and a charge curve (indicated as "B" in FIG. 2A) during the first charge. As shown in FIG. 2A, a charge plateau was observed from around a charge voltage of 2 volts, a charge reaction capacity was large, and good charging characteristics were obtained. That is, in the magnesium secondary battery of Example 1, it was found that MgS having a zinc blende structure and constituting the positive electrode active material layer 23B could electrochemically desorb magnesium ions and sufficiently functioned as a positive electrode active material of a magnesium-sulfur secondary battery.

Figure 2B:
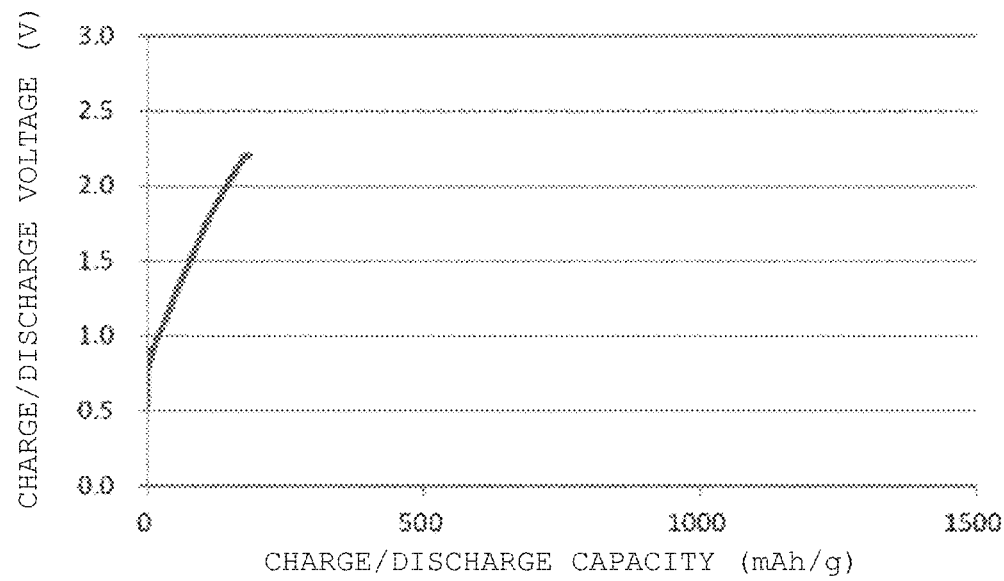
FIG. 2B is a graph showing a charge curve when a first charge in a magnesium secondary battery of Comparative Example 1 is performed.

On the other hand, MgS having a sodium chloride type six-coordinate structure has low ionic conductivity, and as a charge curve during the first charge of the magnesium secondary battery of Comparative Example 1 is shown in FIG. 2B, in MgS having a sodium chloride type six-coordinate structure and constituting the positive electrode active material layer, it has been found that even if the charge voltage exceeds 2 volts, the charge plateau is not observed, and the charge reaction capacity is low, that is, the battery is not charged. This result indicates that, in MgS having a sodium chloride type six-coordinate structure, magnesium ions are not electrochemically desorbed and do not function as a positive electrode active material of a magnesium-sulfur secondary battery.

Figure 4:
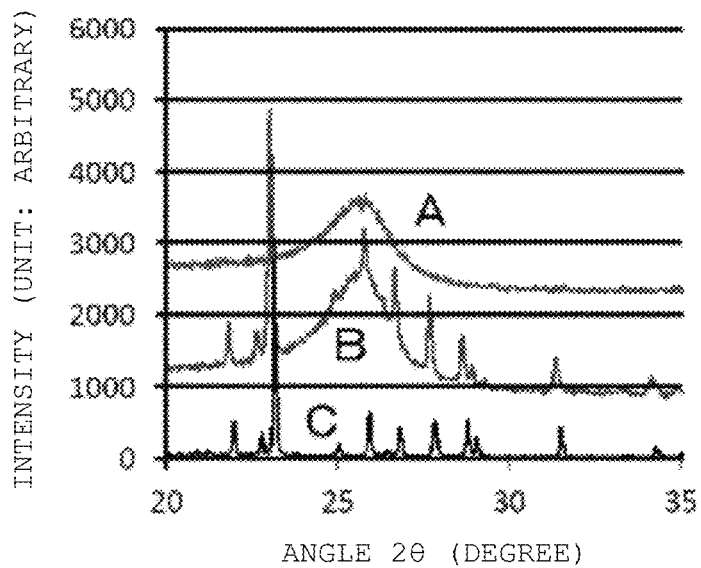
FIG. 4 is a graph showing X-ray diffraction results of the positive electrode active material layer and the like in the magnesium secondary battery of Example 1.

The magnesium secondary battery of Example 1 obtained as described above was decomposed in a glove box, and the positive electrode active material layer was taken out and observed in an argon atmosphere by X-ray diffraction according to the method described above. As a result, it was confirmed that magnesium sulfide was amorphous. FIG. 4 shows a graph showing X-ray diffraction results of the positive electrode active material layer and the like in the magnesium secondary battery of Example 1. In FIG. 4, "A" is an X-ray diffraction result of the positive electrode active material layer in the magnesium secondary battery of Example 1 after the first discharge. "B" is an X-ray diffraction result of the positive electrode active material layer in the magnesium secondary battery of Example 1 before the first discharge. "C" is an X-ray diffraction result of sulfur ($S_8$). It can be clearly seen that although sulfur is present in the positive electrode active material layer in the magnesium secondary battery of Example 1 before the first discharge, no sulfur is present in the positive electrode active material layer in the magnesium secondary battery of Example 1 after the first discharge.

Using first-principles electronic structure calculation based on a density functional theory, chemical shift calculation of solid-state $^{25}$Mg-NMR and solid-state $^{33}$S-NMR in MgS having a zinc blende structure and MgS having a sodium chloride type six-coordinate structure was performed. A calculation code used was Materials Studio (CASTEP), and the calculation conditions were set as follows. That is, the base of calculation was Gauge Including Projector Augmented Wave (GIPAW), and the cut-off energy was 540 eV. An energy functional was of a Perdew-Burke-Ernzerhof (PBE) type, and generalized gradient approximation (GGA) was adopted in the calculation.

Sample k points were extracted by using Monkhorst-Pack method from mesh points of 0.05 $Å_{-1}$ intervals.

The magnesium secondary batteries of Example 1 and Comparative Example 1 obtained as described above were decomposed in a glove box, and the positive electrode active material layer was taken out and shaved to obtain a powdery positive electrode active material. Subsequently, solid-state $^{25}$Mg-NMR measurement and solid-state $^{33}$S-NMR measurement were performed according to the method described above. Chemical shift calculation of $_{25}$Mg-NMR and $_{33}$S-NMR in MgS having a zinc blende structure and MgS having a sodium chloride type six-coordinate structure was performed by first-principle calculation using NMR CASTEP. These results are shown in FIG. 3A. In FIG. 3A, "A", "B", "C", "D", "E", "F", "G", and "H" indicate the following results.

A: Chemical shift calculation result in solid-state $^{25}$Mg-NMR of MgS having a sodium chloride type six-coordinate structure B: Measurement result of solid-state $^{25}$Mg-NMR of MgS having a sodium chloride type six-coordinate structure C: Chemical shift calculation result in solid-state $^{25}$Mg-NMR of MgS having a zinc blende structure D: Measurement result of solid-state $^{25}$Mg-NMR of MgS having a zinc blende structure E: Chemical shift calculation result in solid-state $^{33}$S-NMR of MgS having a sodium chloride type six-coordinate structure F: Measurement result of solid-state $^{33}$S-NMR of MgS having a sodium chloride type six-coordinate structure G: Chemical shift calculation result in solid-state $^{33}$S-NMR of MgS having a zinc blende structure H: Measurement result of solid-state $^{33}$S-NMR of MgS having a zinc blende structure The positive electrode active material in the magnesium secondary battery of Example 1 is in good agreement with the NMR measurement results and the calculation results, and it has been confirmed that the positive electrode active material in the magnesium secondary battery of Example 1 includes MgS having a zinc blende structure. Similarly, the positive electrode active material (MgS having a sodium chloride type six-coordinate structure) in the magnesium secondary battery of Comparative Example 1 is in good agreement with the NMR measurement results and the calculation results, and the validity between the solid-state $^{25}$Mg-NMR measurement and solid-state $^{33}$S-NMR measurement and the first-principle calculation using NMR CASTEP could be verified.

Figure 3B:
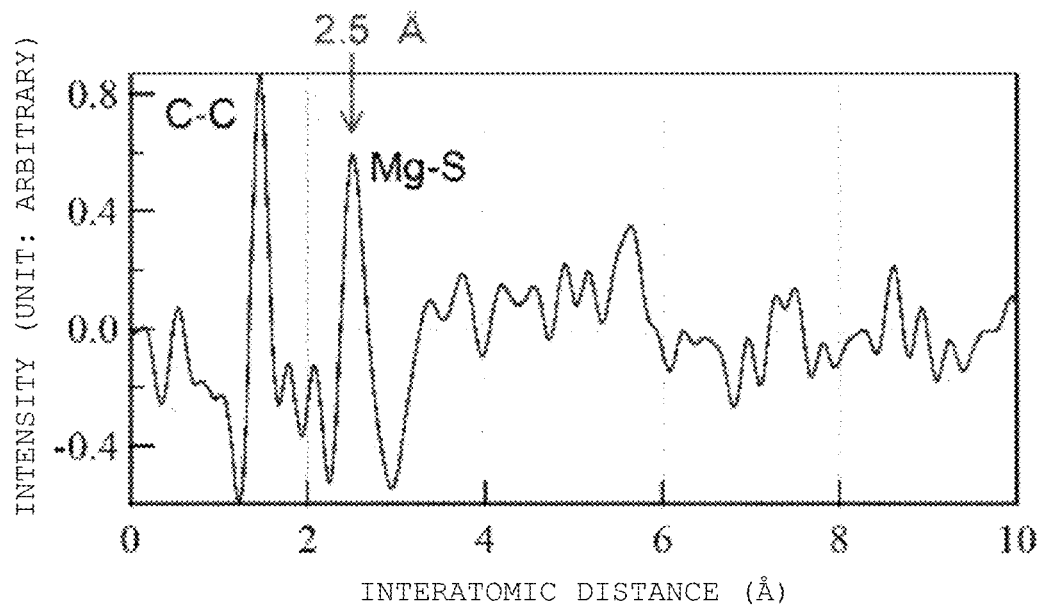
FIG. 3B is a graph showing a result of performing high-energy X-ray diffraction (HE-XRD) measurement of the positive electrode active material layer in the magnesium secondary battery of Example 1 and a result obtained by extracting an atomic pair difference function.

The magnesium secondary battery of Example 1 obtained as described above was decomposed in a glove box, and the positive electrode active material layer was taken out and shaved to obtain a powdery positive electrode active material. Then, HE-XRD measurement is performed, and the result of extracting an atomic pair difference function is shown in FIG. 3B.

It was found that a magnesium-sulfur interatomic distance in the positive electrode active material in the magnesium secondary battery of Example 1 was 2.5 angstroms. This value is smaller than the magnesium-sulfur interatomic distance of 2.6 angstrom (J. Phys. Chem. C 2015, 119, 731-740) of MgS having a sodium chloride type six-coordinate structure, and is a possible value for MgS having a zinc blende structure.

As described above, in the method of producing zinc blende magnesium sulfide of Example 1, a discharge is generated between the first electrode and the second electrode (that is, based on an electrochemical method), so that the sulfur layer formed on the first electrode is changed to a zinc blende magnesium sulfide layer. Therefore, a bulk or powdery zinc blende magnesium sulfide layer can be obtained by an extremely easy method. The zinc blende magnesium sulfide obtained by the method of producing zinc blende magnesium sulfide of Example 1 and magnesium sulfide in bulk or powder having a zinc blende type crystal structure in each of the magnesium sulfide material of Example 1, the magnesium sulfide composite material of Example 1, the positive electrode member for a secondary battery of Example 1, the wide band gap semiconductor material of Example 1, and the positive electrode active material layer of the magnesium secondary battery of Example 1 are in a metastable state. Therefore, magnesium ions can be released relatively easily from zinc blende magnesium sulfide or magnesium sulfide having a zinc blende type crystal structure. Thus, it is possible to achieve a magnesium secondary battery excellent in high energy density and cycle characteristics, and an electronic device and an electrochemical device having excellent characteristics, and, in addition, it is possible to achieve a low-cost and highly safe next-generation secondary battery. The magnesium secondary battery of the present disclosure may be either of a discharge-start type or of a charge-start type.

Example 2

Figure 6:
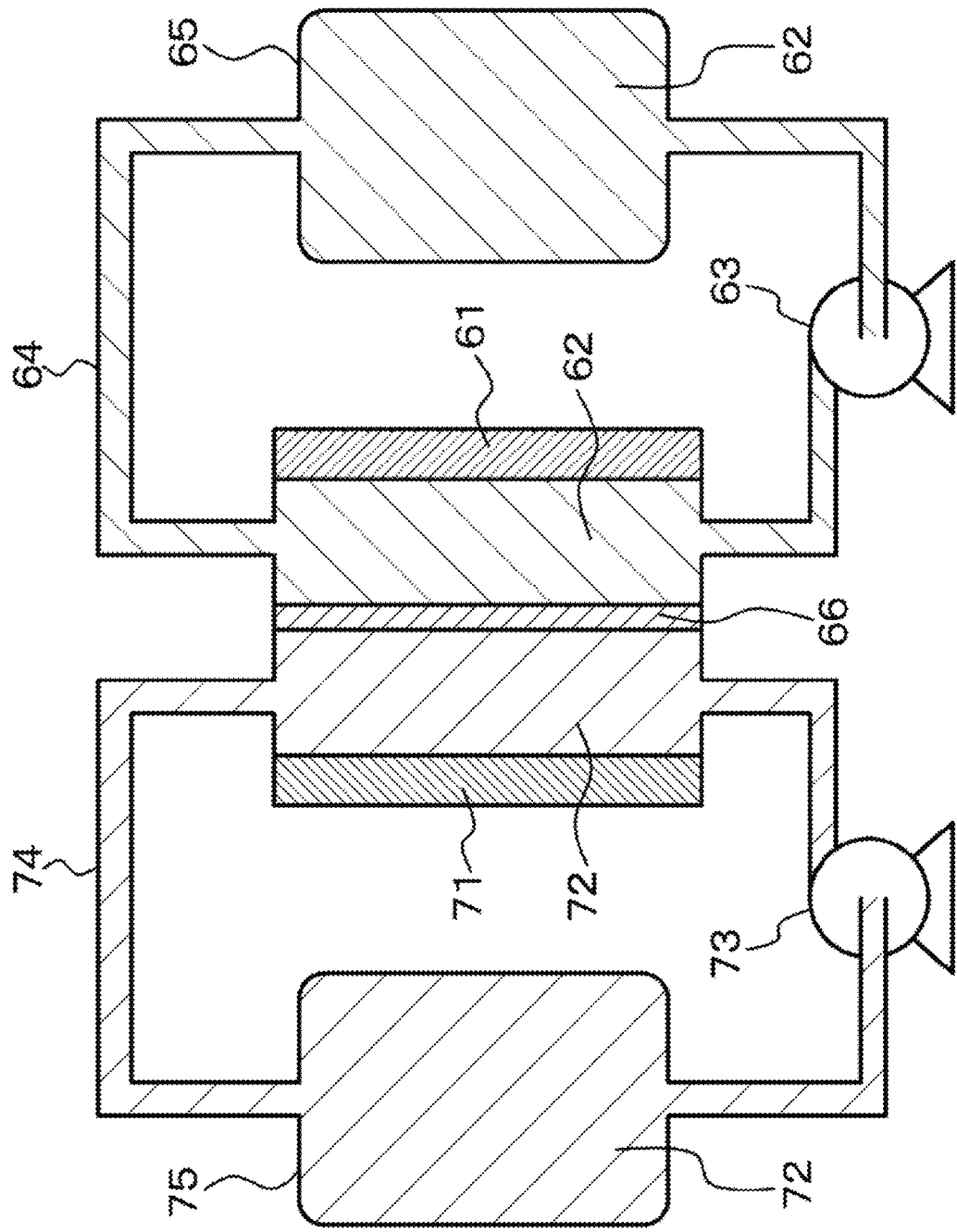
FIG. 6 is a conceptual diagram of an electrochemical device (flow-type secondary battery) of Example 2.

Example 2 is a modification of Example 1. An electrochemical device of Example 2 includes a flow type secondary battery (redox flow battery) as shown in the conceptual diagram of FIG. 6. The flow type secondary battery includes, for example, a positive electrode current collector 61, a positive electrode electrolytic solution 62, a pump 63 for feeding the positive electrode electrolytic solution, a fuel passage 64, a vessel 65 for storing the positive electrode electrolytic solution, a negative electrode current collector 71, a negative electrode electrolytic solution 72, a pump 73 for feeding the negative electrode electrolytic solution, a fuel passage 74, a vessel 75 for storing the negative electrode electrolytic solution, and an ion-exchange membrane 66. The positive electrode electrolytic solution 62 is allowed to flow (circulate) continuously or intermittently into the fuel passage 64 through the vessel 65 for storing the positive electrode electrolytic solution and the pump 63 for feeding the positive electrode electrolytic solution. The negative electrode electrolytic solution 72 is allowed to flow (circulate) continuously or intermittently into the fuel passage 74 through the vessel 75 for storing the negative electrode electrolytic solution and the pump 73 for feeding the negative electrode electrolytic solution. Electric power is generated between the positive electrode current collector 61 and the negative electrode current collector 71. A material obtained by adding a positive electrode active material to the electrolytic solution of Example 1 may be used as the positive electrode electrolytic solution 62. A material obtained by adding a negative electrode active material to the electrolytic solution of Example 1 may be used as the negative electrode electrolytic solution 72.

Example 3

Figure 7:
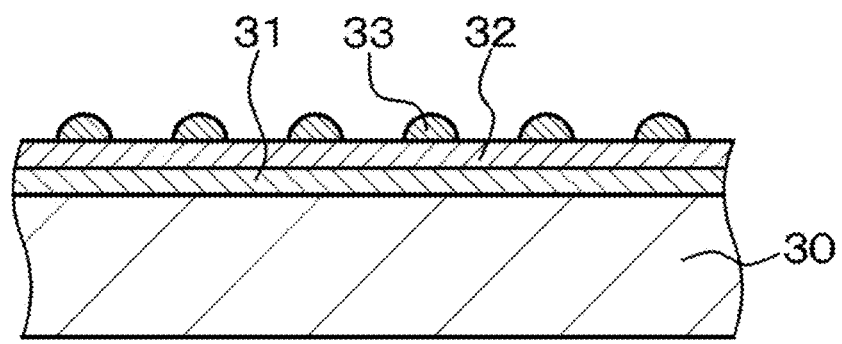
FIG. 7 is a schematic cross-sectional view of an electrochemical device (solar cell) of Example 3.

Example 3 is also a modification of Example 1. In Example 3, the wide band gap semiconductor material described in Example 1 was applied to an electronic device, specifically, a solar cell. As shown in the schematic cross-sectional view of FIG. 7, in the solar cell of Example 3, a current collector 30, a p-type semiconductor layer 31, an n-type semiconductor layer 32 including the wide band gap semiconductor material described in Example 1, and an electrode 33 are stacked. The material of the current collector 30 is not particularly limited as long as the material has electroconductivity and electrochemical durability, and from the viewpoint of heat resistance, metal materials such as iron, copper, aluminum, nickel, stainless steel, titanium, tantalum, molybdenum, gold, and platinum are preferable. The current collector 30 may be formed of an insulating material such as glass and a conductive layer formed on the insulating material. A p-type semiconductor material constituting the p-type semiconductor layer 31 may be appropriately selected from known materials. The electrode 33 may be formed of a known conductive material.

The wide band gap semiconductor material described in Example 1 may also be used as a material constituting an electrode of a water photo electrolysis apparatus.

Example 4

In Example 4, the electrochemical device (specifically, a magnesium secondary battery) according to the present disclosure and an application example thereof will be described.

The magnesium secondary battery of the present disclosure as described in Example 1 can be applied to a machine, a device, an appliance, an apparatus, and a system (an assembly of a plurality of devices or the like) which can be used as a power source for driving/operating the secondary battery or a power storage source for accumulating power without any particular limitation. The magnesium secondary battery (specifically, magnesium-sulfur secondary battery) used as a power source may be a main power source (power source used preferentially) or an auxiliary power source (power source used in place of a main power source, or by switching from the main power source). In a case of using a magnesium secondary battery as an auxiliary power source, a main power source is not limited to a magnesium secondary battery.

Specific examples of an application of the magnesium secondary battery (specifically, magnesium-sulfur secondary battery) of the present disclosure include various electronic devices and electrical devices (including portable electronic devices) such as a video camera, a camcorder, a digital still camera, a mobile phone, a personal computer, a television receiver, various display devices, a cordless phone, a headphone stereo, a music player, a portable radio, electronic paper such as an electronic book or an electronic newspaper, or a portable information terminal including PDA; a toy; a portable living appliance such as an electric shaver; a lighting appliance such as an interior light; a medical electronic device such as a pacemaker or a hearing aid; a storage device such as a memory card; a battery pack used as a detachable power source for a personal computer or the like; an electric tool such as an electric drill or an electric saw; a power storage system or a home energy server (household power storage device) such as a household battery system for accumulating electric power in preparation for emergency or the like and a power supply system; a power storage unit and a backup power source; an electric vehicle such as an electric car, an electric motorcycle, an electric bicycle, or Segway (registered trademark); and a power driving force conversion device of an airplane or a ship (specifically, for example, a power motor), but are not limited to these applications.

Among these applications, the magnesium secondary battery of the present disclosure is effectively applied to a battery pack, an electric vehicle, a power storage system, a power supply system, an electric tool, an electronic device, an electrical device, or the like.

The battery pack is a power source using the magnesium secondary battery of the present disclosure, and is a so-called assembled battery or the like. The electric vehicle is a vehicle which operates (travels) using the magnesium secondary battery of the present disclosure as a driving power source, and may be a car (hybrid car or the like) also including a drive source other than the secondary battery. The power storage system (power supply system) is a system using the magnesium secondary battery of the present disclosure as a power storage source. For example, in the household power storage system (power supply system), power is accumulated in the magnesium secondary battery of the present disclosure as a power storage source, and therefore household electrical products or the like can be used using electric power. The electric tool is a tool in which a movable portion (such as a drill) can move using the magnesium secondary battery of the present disclosure as a driving power source. The electronic device and the electrical device are devices that exhibit various functions using the magnesium secondary battery of the present disclosure as a power source (power supply source) for operation.

Hereinafter, a cylinder type magnesium secondary battery and a flat plate type laminated film type magnesium secondary battery will be described.

Figure 8:
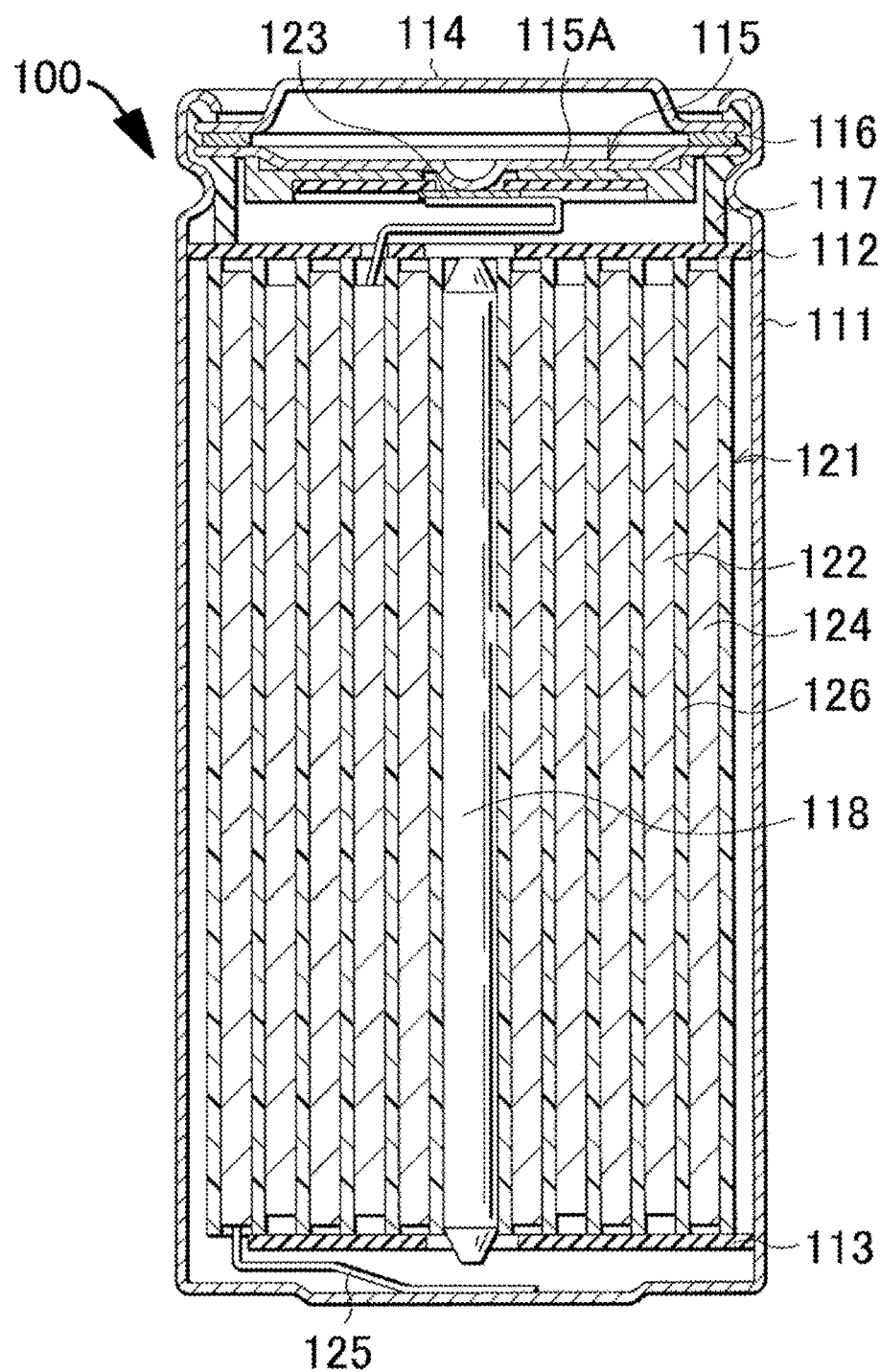
FIG. 8 is a schematic cross-sectional view of a magnesium secondary battery (cylindrical magnesium secondary battery) in Example 4.

FIG. 8 shows a schematic cross-sectional view of a cylinder type magnesium secondary battery 100. In the magnesium secondary battery 100, an electrode structure 121 and a pair of insulating plates 112, 113 are housed inside an electrode structure housing member 111 that has a substantially hollow cylindrical shape. The electrode structure 121 can be manufactured, for example, by stacking a positive electrode member 122 and a negative electrode member 124 with a separator 126 interposed therebetween to obtain an electrode structure and then winding the electrode structure. The positive electrode member 122 includes the magnesium sulfide material or the wide band gap semiconductor material of Example 1, or includes the magnesium sulfide composite material or the positive electrode member of Example 1. The electrode structure housing member (battery can) 111 has a hollow structure in which one end is closed and the other end is open, and includes iron (Fe), aluminum (Al), or the like. Nickel (Ni) or the like may be plated on a surface of the electrode structure housing member 111. The pair of insulating plates 112, 113 is arranged so as to sandwich the electrode structure 121 and to extend perpendicularly to a winding peripheral surface of the electrode structure 121. A battery lid 114, a safety valve mechanism 115, and a positive temperature coefficient device (PTC device) 116 are crimped to the open end of the electrode structure housing member 111 through a gasket 117, and the electrode structure housing member 111 is thereby sealed. For example, the battery lid 114 is manufactured from the same material as that of the electrode structure housing member 111. The safety valve mechanism 115 and the PTC device 116 are provided inside the battery lid 114, and the safety valve mechanism 115 is electrically connected to the battery lid 114 through the PTC device 116. In the safety valve mechanism 115, when an internal pressure becomes a certain level or higher due to internal short circuit, external heating, or the like, a disk plate 115A is inverted. As a result, the electrical connection between the battery lid 114 and the electrode structure 121 is disconnected. In order to prevent abnormal heat generation due to a large amount of current, resistance of the PTC device 116 increases with an increase in temperature. The gasket 117 is formed from, for example, an insulating material. A surface of the gasket 117 may be coated with asphalt or the like.

A center pin 118 is inserted into a winding center of the electrode structure 121. However, the center pin 118 may not be inserted into the winding center. A positive electrode lead portion 123 manufactured from a conductive material such as aluminum is connected to the positive electrode member 122. Specifically, the positive electrode lead portion 123 is attached to a positive electrode current collector. A negative electrode lead portion 125 manufactured from a conductive material such as copper is connected to the negative electrode member 124. Specifically, the negative electrode lead portion 125 is attached to a negative electrode current collector. The negative electrode lead portion 125 is welded to the electrode structure housing member 111 and is electrically connected to the electrode structure housing member 111. The positive electrode lead portion 123 is welded to the safety valve mechanism 115 and is electrically connected to the battery lid 114. Incidentally, in the example shown in FIG. 8, the negative electrode lead portion 125 is disposed at one place (outermost peripheral portion of the wound electrode structure), but may be disposed at two places (outermost peripheral portion and innermost peripheral portion of the wound electrode structure).

The electrode structure 121 includes the positive electrode member 122 having a positive electrode active material layer formed on the positive electrode current collector (specifically, on both surfaces of the positive electrode current collector) and the negative electrode member 124 having a negative electrode active material layer formed on the negative electrode current collector (specifically, on both surfaces of the negative electrode current collector) stacked with the separator 126 interposed therebetween. The positive electrode active material layer is not formed in a region of the positive electrode current collector to which the positive electrode lead portion 123 is attached. The negative electrode active material layer is not formed in a region of the negative electrode current collector to which the negative electrode lead portion 125 is attached.

Specifications of the magnesium secondary battery 100 are exemplified in the following Table 4, but are not limited thereto.

TABLE 4

| Positive electrode current collector | Nickel foil having a thickness of 20 μm |
|---|---|
| Positive electrode active material layer | Thickness per surface 50 μm |
| Positive electrode lead portion | Nickel foil having a thickness of 100 μm |
| Negative electrode current collector | Copper foil having a thickness of 20 μm |
| Negative electrode active material layer | Thickness per surface 50 μm |
| Negative electrode lead portion | Nickel (Ni) foil having a thickness of 100 μm |

For example, the magnesium secondary battery 100 can be manufactured based on the following procedure.

First, a sulfur layer used for forming positive electrode active material layers on both surfaces of a positive electrode current collector is formed, and negative electrode active material layers are formed on both surfaces of the negative electrode current collector.

Thereafter, the positive electrode lead portion 123 is attached to the positive electrode current collector using a welding method or the like. Furthermore, the negative electrode lead portion 125 is attached to the negative electrode current collector using a welding method or the like. Subsequently, the positive electrode member 122 and the negative electrode member 124 are stacked with a 20-μm-thick microporous polyethylene film separator 126 interposed therebetween, and are wound (more specifically, the electrode structure (stacked structure) of the positive electrode member 122/separator 126/negative electrode member 124/separator 126 is wound) to manufacture the electrode structure 121. Thereafter, a protective tape (not shown) is adhered to an outermost peripheral portion. Thereafter, the center pin 118 is inserted into a center of the electrode structure 121. Subsequently, the electrode structure 121 is housed inside the electrode structure housing member (battery can) 111 while the electrode structure 121 is sandwiched between the pair of insulating plates 112 and 113. In this case, a tip end of the positive electrode lead portion 123 is attached to the safety valve mechanism 115, and a tip end of the negative electrode lead portion 125 is attached to the electrode structure housing member 111 using a welding method or the like. Thereafter, the electrolytic solution of Example 1 is injected based on a depressurization method, and the separator 126 is impregnated with the electrolytic solution. Subsequently, the battery lid 114, the safety valve mechanism 115, and the PTC device 116 are crimped to an open end of the electrode structure housing member 111 via the gasket 117.

Then, a discharge is generated between the battery lid 114 and the electrode structure housing member 111, so that the sulfur layer formed on the positive electrode current collector is changed to a zinc blende magnesium sulfide layer (a layer including magnesium sulfide having a zinc blende type crystal structure). Thus, the magnesium secondary battery 100 can be obtained.

Figure 9:
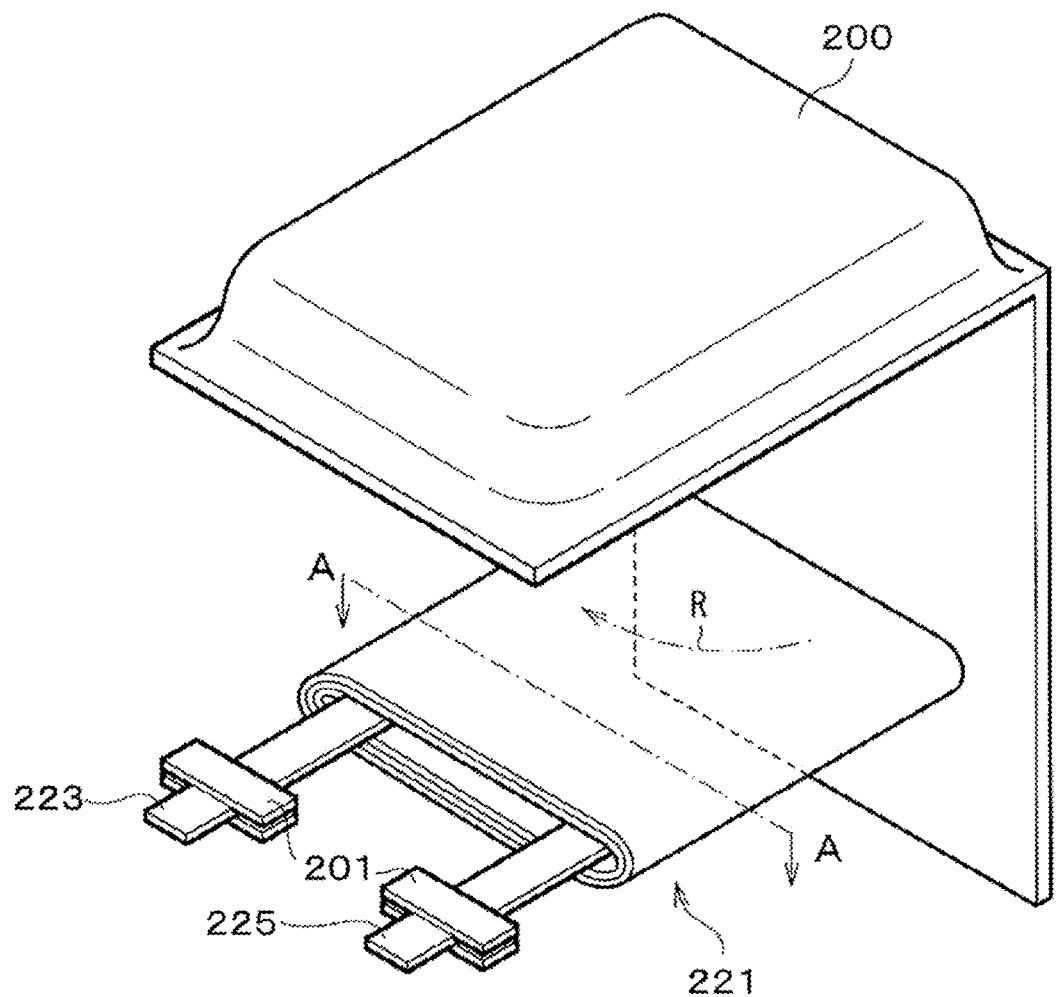
FIG. 9 is a schematic cross-sectional view of a magnesium secondary battery (flat plate type laminated film type magnesium secondary battery) in Example 4.

Next, a flat plate type laminated film type magnesium secondary battery will be described. FIG. 9 shows a schematic exploded perspective view of the magnesium secondary battery. In this magnesium secondary battery, an electrode structure 221 basically similar to that described above is housed inside an exterior member 200 including a laminated film. The electrode structure 221 can be manufactured by stacking a positive electrode member and a negative electrode member with a separator and an electrolyte layer interposed therebetween, and then winding this stacked structure. A positive electrode lead portion 223 is attached to the positive electrode member, and a negative electrode lead portion 225 is attached to the negative electrode member. An outermost peripheral portion of the electrode structure 221 is protected by a protective tape. The positive electrode lead portion 223 and the negative electrode lead portion 225 protrude in the same direction from the inside to the outside of the exterior member 200. The positive electrode lead portion 223 includes a conductive material such as aluminum. The negative electrode lead portion 225 includes a conductive material such as copper, nickel, and/or stainless steel.

The exterior member 200 is a single film foldable in a direction of the arrow R shown in FIG. 9, and has a recess (emboss) for housing the electrode structure 221 in a part of the exterior member 200. The exterior member 200 is a laminated film in which a fusion-bonding layer, a metal layer, and a surface protective layer are stacked in this order, for example. In a step of manufacturing the magnesium secondary battery, the exterior member 200 is folded such that the fusion layers face each other through the electrode structure 221, and then outer peripheral edges of the fusion layers are fused to each other. However, the exterior member 200 may be obtained by bonding two laminated films to each other using an adhesive or the like. For example, the fusion layer includes a film of polyethylene and/or polypropylene. For example, the metal layer includes an aluminum foil or the like. For example, the surface protective layer includes nylon and/or polyethylene terephthalate. In particular, the exterior member 200 is preferably an aluminum laminated film in which a polyethylene film, an aluminum foil, and a nylon film are stacked in this order. However, the exterior member 200 may be a laminated film having any other laminated structure, a polymer film such as polypropylene, or a metal film. Specifically, the exterior member 200 includes a moisture-resistant aluminum laminated film (total thickness 100 µm) obtained by laminating a nylon film (thickness 30 µm), an aluminum foil (thickness 40 µm), and an unstretched polypropylene film (thickness 30 µm) in this order from outside.

In order to prevent entry of outside air, an adhesive film 201 is inserted between the exterior member 200 and the positive electrode lead portion 223 and between the exterior member 200 and the negative electrode lead portion 225.

The adhesive film 201 includes a material having adhesion to the positive electrode lead portion 223 and the negative electrode lead portion 225, for example, a polyolefin resin, more specifically, a polyolefin resin such as polyethylene, polypropylene, modified polyethylene, and/or modified polypropylene.

Next, several application examples of the magnesium secondary battery of the present disclosure will be specifically described. Incidentally, configurations of application examples described below are merely examples, and can be appropriately changed.

A battery pack is a simple type battery pack (so-called soft pack) including one of the magnesium secondary batteries of the present disclosure, and is mounted on an electronic device typified by a smartphone, for example. Alternatively, the battery pack includes an assembled battery including six magnesium secondary batteries connected in two parallel and three series in the present disclosure. Incidentally, the connection form of the magnesium secondary batteries may be a series form, a parallel form, or a mixed form thereof.

Figure 10:
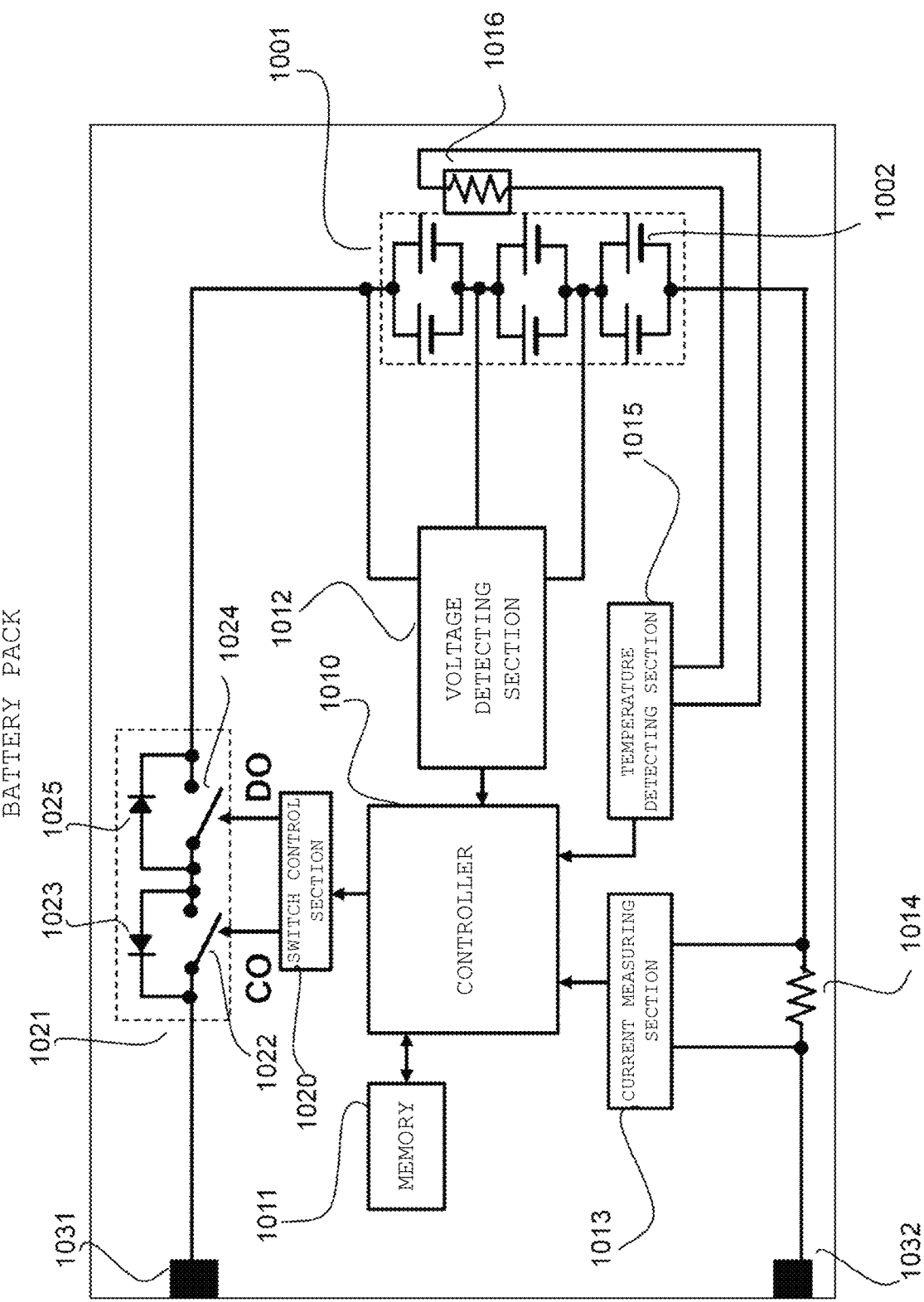
FIG. 10 is a block diagram showing a circuit configuration example in Example 4 in a case where the magnesium secondary battery of the present disclosure described in Example 1 is applied to a battery pack.

FIG. 10 shows a block diagram showing a circuit configuration example in a case where the magnesium secondary battery of the present disclosure is applied to a battery pack. The battery pack includes a cell (assembled battery) 1001, an exterior member, a switch section 1021, a current detection resistor 1014, a temperature detection element 1016, and a controller 1010. The switch section 1021 includes a charge control switch 1022 and a discharge control switch 1024. Furthermore, the battery pack includes a positive electrode terminal 1031 and a negative electrode terminal 1032. At the time of charging, the positive electrode terminal 1031 and the negative electrode terminal 1032 are connected to a positive electrode terminal and a negative electrode terminal of a charger, respectively, and are charged. Furthermore, at the time of using an electronic device, the positive electrode terminal 1031 and the negative electrode terminal 1032 are connected to a positive electrode terminal and a negative electrode terminal of the electronic device, respectively, and are discharged.

The cell 1001 is constituted by connecting a plurality of magnesium secondary batteries 1002 in the present disclosure in series and/or in parallel. Incidentally, FIG. 10 shows a case where the six magnesium secondary batteries 1002 are connected in two parallel and three series (2P3S). However, any other connection method such as p parallel and q series (where p and q are integers) may be used.

The switch section 1021 includes the charge control switch 1022, a diode 1023, the discharge control switch 1024, and a diode 1025, and is controlled by the controller 1010. The diode 1023 has a backward polarity with respect to a charge current flowing in a direction from the positive electrode terminal 1031 to the cell 1001, and a forward polarity with respect to a discharge current flowing in a direction from the negative electrode terminal 1032 to the cell 1001. The diode 1025 has a forward polarity with respect to the charge current and a backward polarity with respect to the discharge current. Incidentally, in the example, the switch section is disposed on a plus (+) side, but may be disposed on a minus (−) side. The controller 1010 controls the charge control switch 1022 such that the charge control switch 1022 is closed in a case where a battery voltage reaches an overcharge detection voltage, and no charge current flows in a current path of the cell 1001. After the charge control switch 1022 is closed, only discharge can be performed through the diode 1023. Furthermore, the controller 1010 controls the charge control switch 1022 such that the charge control switch 1022 is closed in a case where a large amount of current flows during charging, and a charge current flowing in a current path of the cell 1001 is cut off. The controller 1010 controls the discharge control switch 1024 such that the discharge control switch 1024 is closed in a case where a battery voltage reaches an overdischarge detection voltage, and no discharge current flows in a current path of the cell 1001. After the discharge control switch 1024 is closed, only charge can be performed through the diode 1025. Furthermore, the controller 1010 controls the discharge control switch 1024 such that the discharge control switch 1024 is closed in a case where a large amount of current flows during discharging, and a discharge current flowing in a current path of the cell 1001 is cut off.

For example, the temperature detection element 1016 includes a thermistor, and is disposed in the vicinity of the cell 1001. A temperature measuring section 1015 measures the temperature of the cell 1001 using the temperature detection element 1016, and sends the measurement result to the controller 1010. A voltage measuring section 1012 measures the voltage of the cell 1001 and the voltage of each of the magnesium secondary batteries 1002 constituting the cell 1001, performs A/D conversion of the measurement result, and sends the converted result to the controller 1010. A current measuring section 1013 measures a current using the current detection resistor 1014, and sends the measurement result to the controller 1010.

A switch control section 1020 controls the charge control switch 1022 and the discharge control switch 1024 of the switch section 1021 based on a voltage and a current sent from the voltage measuring section 1012 and the current measuring section 1013. When a voltage of any one of the magnesium secondary batteries 1002 becomes equal to or lower than the overcharge detection voltage or overdischarge detection voltage, or when a large amount of current rapidly flows, the switch control section 1020 sends a control signal to the switch section 1021, and thereby prevents overcharge, overdischarge, and overcurrent charge/discharge. The charge control switch 1022 and the discharge control switch 1024 can be constituted by a semiconductor switch such as a MOSFET.

In this case, the diodes 1023, 1025 are constituted by parasitic diodes of a MOSFET. In a case where a p-channel type FET is used as a MOSFET, the switch control section 1020 supplies a control signal DO and a control signal CO to a gate of each of the charge control switch 1022 and the discharge control switch 1024. The charge control switch 1022 and the discharge control switch 1024 become conductive due to a gate potential lower than a source potential by a predetermined value or more. That is, in normal charging and discharging operation, each of the control signal CO and the control signal DO is set to a low level, and the charge control switch 1022 and the discharge control switch 1024 are caused to be conductive.

In addition, for example, during overcharge or overdischarge, each of the control signal CO and the control signal DO is set to a high level, and the charge control switch 1022 and the discharge control switch 1024 are closed.

For example, a memory 1011 includes an EPROM (Erasable Programmable Read Only Memory) which is a non-volatile memory. In the memory 1011, a numerical value calculated by the controller 1010, an internal resistance value of each of the magnesium secondary batteries 1002 in an initial state, measured at a stage of a manufacturing step, and the like are previously stored, and can be rewritten appropriately. Furthermore, by causing the memory 1011 to store a full charge capacity of each of the magnesium secondary batteries 1002, the memory 1011 can calculate a remaining capacity together with the controller 1010, for example.

The temperature measuring section 1015 measures a temperature using the temperature detection element 1016, performs charge/discharge control at the time of abnormal heat generation, and performs correction in calculating the remaining capacity.

Figure 11A:
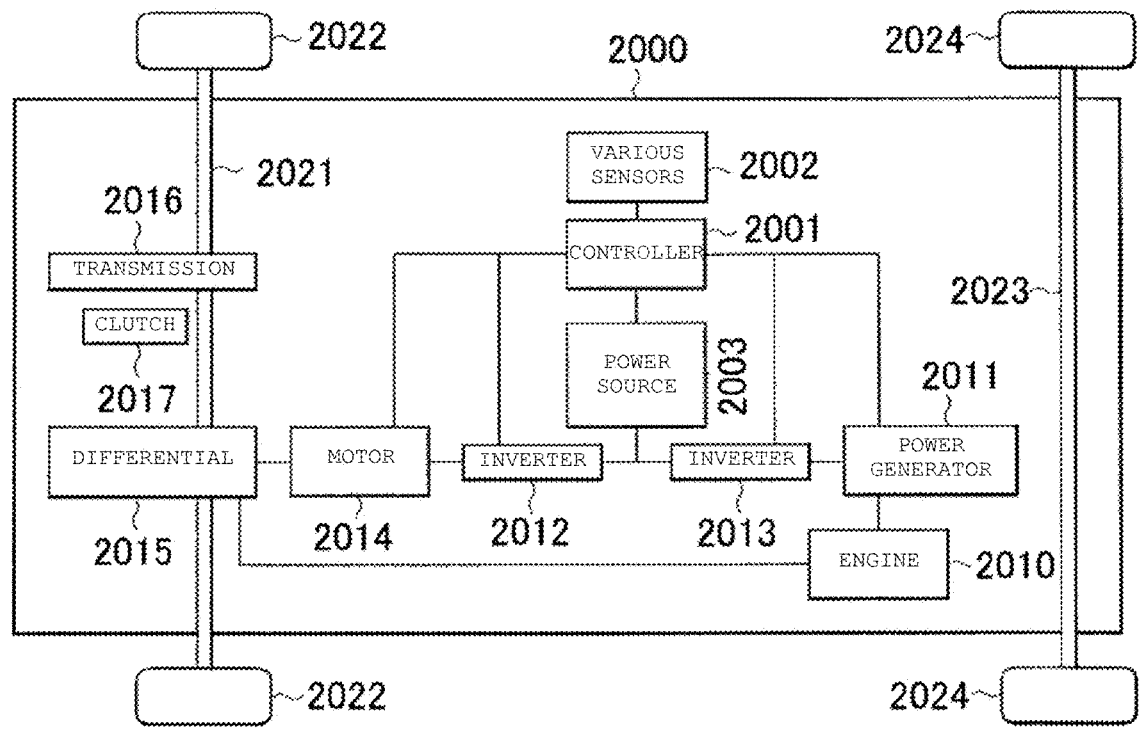
FIG. 11A is a block diagram showing a configuration of an application example (electric vehicle) of the present disclosure in Example 4.

Next, FIG. 11A shows a block diagram illustrating a configuration of an electric vehicle such as a hybrid car which is an example of an electric vehicle. For example, the electric vehicle includes a controller 2001, various sensors 2002, a power source 2003, an engine 2010, a power generator 2011, inverters 2012, 2013, a driving motor 2014, a differential 2015, a transmission 2016, and a clutch 2017 in a housing 2000 made of metal. In addition, for example, the electric vehicle includes a front wheel drive shaft 2021, front wheels 2022, a rear wheel drive shaft 2023, and rear wheels 2024 connected to the differential 2015 or the transmission 2016.

For example, the electric vehicle can travel using either the engine 2010 or the motor 2014 as a drive source. The engine 2010 is a main power source, and is, for example, a gasoline engine. In a case where the engine 2010 is used as a power source, for example, a driving force (rotational force) of the engine 2010 is transmitted to the front wheels 2022 or the rear wheels 2024 through the differential 2015, the transmission 2016, and the clutch 2017 which are drive units. The rotational force of the engine 2010 is also transmitted to the power generator 2011. The power generator 2011 generates AC power using the rotational force. The AC power is converted into DC power through the inverter 2013. The DC power is accumulated in the power source 2003. Meanwhile, in a case where the motor 2014 which is a conversion section is used as a power source, electric power (DC power) supplied from the power source 2003 is converted into AC power through the inverter 2012, and the motor 2014 is driven using the AC power. The driving force (rotational force) converted from the electric power by the motor 2014 is transmitted to the front wheels 2022 or the rear wheels 2024 through the differential 2015, the transmission 2016, and the clutch 2017 which are drive sections, for example.

When the electric vehicle decelerates by a brake mechanism (not shown), a resistance force at the time of deceleration is transmitted to the motor 2014 as a rotational force, and the motor 2014 may generate AC power using this rotational force. The AC power is converted into DC power through the inverter 2012, and the DC regenerative power is accumulated in the power source 2003.

The controller 2001 controls operation of the entire electric vehicle, and includes a CPU, for example. The power source 2003 includes one or two or more magnesium secondary batteries (not shown) described in Example 1. The power source 2003 may have a configuration to accumulate electric power by being connected to an external power source and receiving electric power from the external power source. For example, the various sensors 2002 are used in order to control the number of revolutions of the engine 2010 and to control an opening degree of a throttle valve (throttle opening degree) (not shown). The various sensors 2002 include a speed sensor, an acceleration sensor, and an engine speed sensor, for example.

Incidentally, a case where the electric vehicle is a hybrid car has been described. However, the electric vehicle may be a vehicle (electric car) which operates using only the power source 2003 and the motor 2014 without using the engine 2010.

Figure 11B:
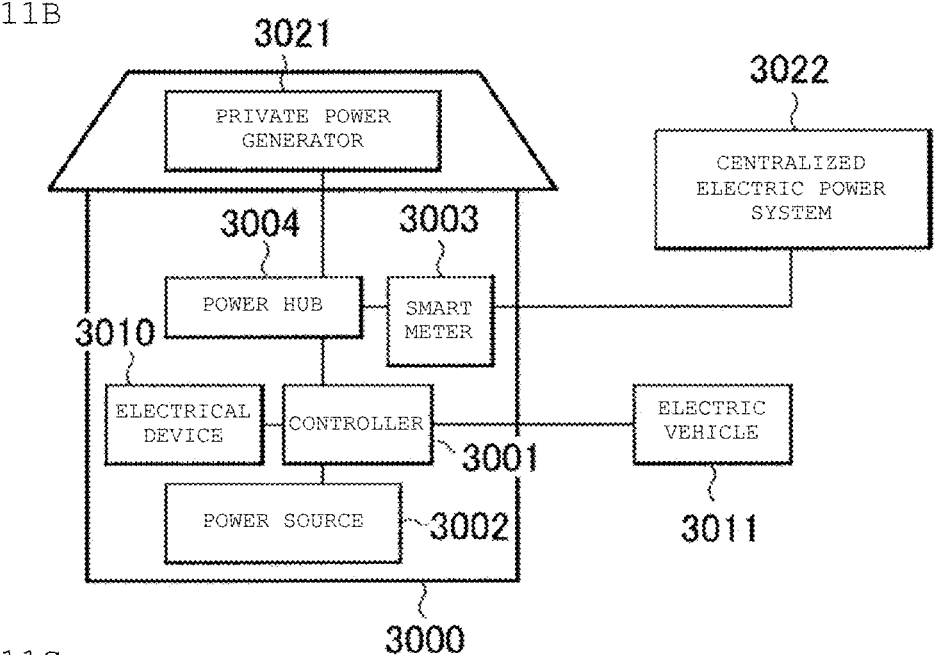
FIG. 11B is a block diagram showing a configuration of an application example (power storage system) of the present disclosure in Example 4.

Next, FIG. 11B shows a block diagram showing a configuration of a power storage system (power supply system). For example, the power storage system includes a controller 3001, a power source 3002, a smart meter 3003, and a power hub 3004 inside a house 3000 such as a general house or a commercial building.

For example, the power source 3002 is connected to an electrical device (electronic device) 3010 installed inside the house 3000, and can be connected to an electric vehicle 3011 which parks outside the house 3000. Furthermore, for example, the power source 3002 is connected to a private power generator 3021 installed in the house 3000 through a power hub 3004, and can be connected to an external centralized electric power system 3022 through the smart meter 3003 and the power hub 3004. For example, the electrical device (electronic device) 3010 includes one or two or more household electric appliances. Examples of the household electric appliances include a refrigerator, an air conditioner, a television receiver, and a water heater. For example, the private power generator 3021 is constituted by a solar power generator or a wind power generator. Examples of the electric vehicle 3011 include an electric car, a hybrid car, an electric motorcycle, an electric bicycle, and a Segway (registered trademark). Examples of the centralized electric power system 3022 include a commercial power source, a power generation device, a power transmission network, and a smart grid (next generation power transmission network). Furthermore, examples thereof include a thermal power plant, a nuclear power plant, a hydraulic power plant, and a wind power plant. Examples of the power generation device included in the centralized electric power system 3022 include various solar batteries, a fuel battery, a wind power generation device, a micro hydraulic power generation device, and a geothermal power generation device. However, the centralized electric power system 3022 and the power generation device are not limited thereto.

The controller 3001 controls operation of the entire power storage system (including a used state of the power source 3002), and includes a CPU, for example. The power source 3002 includes one or two or more magnesium secondary batteries (not shown) described in Example 1. The smart meter 3003 is, for example, an electric power meter that is compatible with a network and is provided in the house 3000 demanding electric power, and may be communicable with an electric power supplier. In addition, for example, the smart meter 3003 controls balance between supply and demand in the house 3000 while communicating with outside, thereby allowing efficient and stable supply of energy.

In this power storage system, for example, electric power is accumulated in the power source 3002 from the centralized electric power system 3022 which is an external power source through the smart meter 3003 and the power hub 3004, and electric power is accumulated in the power source 3002 from the private power generator 3021 which is an independent power source through the power hub 3004. The electric power accumulated in the power source 3002 is supplied to the electrical device (electronic device) 3010 and the electric vehicle 3011 according to an instruction of the controller 3001. Therefore, the electrical device (electronic device) 3010 can be operated, and the electric vehicle 3011 can be charged. That is, the power storage system is a system which makes it possible to accumulate and supply electric power in the house 3000 using the power source 3002.

The electric power accumulated in the power source 3002 can be arbitrarily used. Therefore, for example, power is accumulated in the power source 3002 from the centralized electric power system 3022 at midnight when electricity charge is inexpensive, and the power accumulated in the power source 3002 can be used during the daytime when the electricity charge is expensive.

The power storage system described above may be installed in each house (each household) or may be installed in every two or more houses (two or more households).

Figure 11C:
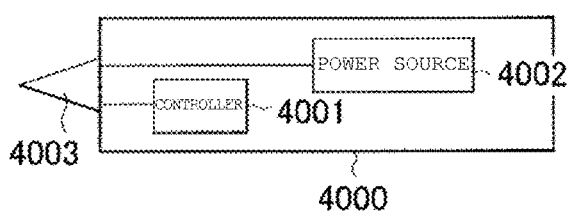
FIG. 11C is a block diagram showing a configuration of an application example (electric tool) of the present disclosure in Example 4.

Next, FIG. 11C shows a block diagram showing a configuration of the electric tool. For example, the electric tool is an electric drill, and includes a controller 4001 and a power source 4002 inside a tool body 4000 made of a plastic material or the like. For example, a drill section 4003 which is a movable portion is rotatably attached to the tool body 4000. The controller 4001 controls operation of the entire electric tool (including a used state of the power source 4002), and includes a CPU, for example. The power source 4002 includes one or two or more magnesium secondary batteries (not shown) described in Example 1. The controller 4001 supplies electric power from the power source 4002 to the drill section 4003 in response to operation of an operation switch (not shown).

Hitherto, the present disclosure has been described based on preferable examples. However, the present disclosure is not limited to these examples. The raw materials of various members constituting the magnesium secondary battery, the manufacturing method, the manufacturing conditions, and the configurations and structures of the electronic device, the electrochemical device, and the magnesium secondary battery, described in examples, are illustrative, are not limited thereto, and can be changed appropriately. For example, in the magnesium sulfide composite material of the present disclosure, as described in Example 1, only a magnesium sulfide material layer may be formed on a substrate, or in some cases, a sulfur layer may be provided between the substrate and the magnesium sulfide material layer.

Note that the present disclosure may also take the following configurations.

[A01]

<<Method of Producing Zinc Blende Magnesium Sulfide>>

A method of producing zinc blende magnesium sulfide including arranging a sulfur layer formed on a first electrode and a second electrode containing magnesium or a magnesium compound in a state in which an electrolytic solution containing a magnesium salt is sandwiched and causing a discharge between the first electrode and the second electrode to change the sulfur layer formed on the first electrode to a zinc blende magnesium sulfide layer.

[A02]

The method of producing zinc blende magnesium sulfide according to [A01], in which the first electrode and the second electrode are electrically connected via a resistor to cause a discharge between the first electrode and the second electrode.

[A03]

The method of producing zinc blende magnesium sulfide according to [A01] or [A02], in which the magnesium salt includes magnesium chloride, and the electrolytic solution contains ethyl-n-propylsulfone.

[B01]<<Magnesium Sulfide Material>>

A magnesium sulfide material including amorphous magnesium sulfide or a mixture containing crystallites with a particle size of 20 nm or less in amorphous magnesium sulfide, in which the crystallite includes magnesium sulfide having a zinc blende type crystal structure.

[C01]

<<Magnesium Sulfide Composite Material>>

A magnesium sulfide composite material having a magnesium sulfide material layer formed on a substrate, in which the magnesium sulfide material layer includes amorphous magnesium sulfide or a mixture containing crystallites with a particle size of 20 nm or less in amorphous magnesium sulfide, and the crystallite includes magnesium sulfide having a zinc blende type crystal structure.

[C02]

The magnesium sulfide composite material according to [C01], including a sulfur layer between a substrate and the magnesium sulfide material layer.

[D01]

<<Positive Electrode Member for Secondary Battery>>

A positive electrode member for a secondary battery formed by forming a magnesium sulfide material layer, including magnesium sulfide having a zinc blende type crystal structure, on a positive electrode current collector.

[D02]

The positive electrode member for a secondary battery according to [D01], in which a magnesium sulfide material layer includes amorphous magnesium sulfide or a mixture containing crystallites with a particle size of 20 nm or less in amorphous magnesium sulfide, and the crystallite includes magnesium sulfide having a zinc blende type crystal structure.

[E01]

<<Magnesium Secondary Battery>>

A magnesium secondary battery including a positive electrode member including at least a positive electrode active material layer, a separator disposed facing the positive electrode member, a negative electrode member containing magnesium or a magnesium compound disposed facing the separator, and an electrolytic solution containing a magnesium salt, in which the positive electrode active material layer includes magnesium sulfide having a zinc blende type crystal structure.

[E02]

The magnesium secondary battery according to [E01], in which a positive electrode active material layer includes amorphous magnesium sulfide or a mixture containing crystallites with a particle size of 20 nm or less in amorphous magnesium sulfide, and the crystallite includes magnesium sulfide having a zinc blende type crystal structure.

[E03]

The magnesium secondary battery according to [E01] or [E02], in which the electrolytic solution includes a solvent including sulfone and a magnesium salt dissolved in the solvent.

[E04]

The magnesium secondary battery according to [E03], in which the magnesium salt includes magnesium chloride, and the sulfone constituting the solvent includes ethyl-n-propylsulfone.

[F01]

<<Wide Band Gap Semiconductor Material>>

A wide band gap semiconductor material including amorphous magnesium sulfide or a mixture containing crystallites with a particle size of 20 nm or less in amorphous magnesium sulfide, in which the crystallite includes magnesium sulfide having a zinc blende type crystal structure.

[G01]

<<Battery Pack>>

A battery pack including a secondary battery, a control unit for controlling the secondary battery, and an exterior enclosing the secondary battery, in which the secondary battery includes the magnesium secondary battery according to any one of [E01] to [E04].

[G02]

<<Electronic Device>>

An electronic device that receives a supply of electric power from a secondary battery, the secondary battery including the magnesium secondary battery according to any one of [E01] to [E04].

[G03]

<<Electric Vehicle>>

An electric vehicle including a conversion device for converting electric power supplied from a secondary battery into a driving force of the vehicle and a control device for performing information processing related to vehicle control based on information on the secondary battery, in which the secondary battery includes the magnesium secondary battery according to any one of [E01] to [E04].

[G04]

<<Electric Power System>>

A power system configured to receive electric power from a secondary battery and/or to supply electric power from a power source to the secondary battery, the secondary battery including the magnesium secondary battery according to any one of [E01] to [E04].

[G05]

<<Power Storage Power Source>>

A power storage power source including a secondary battery and configured to be connected to an electronic device to which electric power is supplied, in which the secondary battery includes the magnesium secondary battery according to any one of [E01] to [E04].

DESCRIPTION OF REFERENCE SYMBOLS

- 10: Positive electrode member
- 11: Negative electrode member
- 12: Electrolyte Layer
- 20: Magnesium secondary battery (coin battery)
- 21: Coin battery can
- 22: Gasket
- 23: Positive electrode member
- 23A: Positive electrode current collector
- 23B: Magnesium sulfide material layer (positive electrode active material layer)
- 24: Separator
- 25: Negative electrode member
- 26: Spacer
- 27: Coin battery lid
- 30: Current collector
- 31: p-type semiconductor layer
- 32: n-type semiconductor layer
- 33: Electrode
- 61: Positive electrode current collector
- 62: Positive electrode electrolytic solution
- 63: Pump for feeding positive electrode electrolytic solution
- 64: Fuel passage
- 65: Vessel for storing positive electrode electrolytic Solution
- 71: Negative electrode current collector
- 72: Negative electrode electrolytic solution
- 73: Pump for feeding negative electrode electrolytic solution
- 74: Fuel passage
- 75: Vessel for storing negative electrode electrolytic solution
- 66: Ion-exchange membrane
- 100: Magnesium secondary battery
- 111: Electrode structure housing member (battery can)
- 112, 113: Insulating plate
- 114: Battery lid
- 115: Safety valve mechanism
- 115A: Disk plate
- 116: Positive temperature coefficient (PTC) element
- 117: Gasket
- 118: Center pin
- 121: Electrode structure
- 122: Positive electrode member
- 123: Positive electrode lead portion
- 124: Negative electrode member
- 125: Negative electrode lead portion
- 126: Separator
- 200: Exterior member
- 201: Adhesive film
- 221: Electrode structure
- 223: Positive electrode lead portion
- 225: Negative electrode lead portion
- 1001: Cell (assembled battery)
- 1002: Magnesium secondary battery
- 1010: Controller
- 1011: Memory
- 1012: Voltage measuring section
- 1013: Current measuring section
- 1014: Current detection resistor
- 1015: Temperature measuring section
- 1016: Temperature detection element
- 1020: Switch control section
- 1021: Switch section
- 1022: Charge control switch
- 1024: Discharge control switch
- 1023, 1025: Diode
- 1031: Positive electrode terminal
- 1032: Negative electrode terminal
- CO, DO: Control signal
- 2000: Housing
- 2001: Controller
- 2002: Various sensors
- 2003: Power source
- 2010: Engine
- 2011: Power generator
- 2012, 2013: Inverter
- 2014: Driving motor
- 2015: Differential
- 2016: Transmission
- 2017: Clutch
- 2021: Front wheel drive shaft
- 2022: Front wheel 2023: Rear wheel drive shaft
2024: Rear wheel
3000: House
3001: Controller
3002: Power source
3003: Smart meter
3004: Power hub
3010: Electrical device (electronic device)
3011: Electric vehicle
3021: Private power generator
3022: Centralized electric power system
4000: Tool body
4001: Controller
4002: Power source
4003: Drill section

The invention claimed is:

1. A magnesium secondary battery comprising:
a positive electrode member including at least a positive electrode active material layer, wherein the positive electrode active material layer comprises a magnesium sulfide having a zinc blende type structure, the magnesium sulfide comprising an amorphous magnesium sulfide or a mixture containing a plurality of crystallites comprising the magnesium sulfide having a zinc blende type crystal structure in the amorphous magnesium sulfide;
a separator disposed facing the positive electrode member;
a negative electrode member containing magnesium or a magnesium compound disposed facing the separator; and
an electrolytic solution comprising a solvent comprising a sulfone comprising ethyl-n-propylsulfone and a magnesium salt dissolved in the solvent, wherein the magnesium salt includes a magnesium chloride.

2. The magnesium secondary battery according to claim 1, wherein the crystallites have a particle size of 20 nm.

3. The magnesium secondary battery according to claim 1, wherein the positive electrode member includes a positive electrode current collector and the positive electrode active material layer formed on the positive electrode current collector.

* * * * *